(12) United States Patent
Shibata et al.

(10) Patent No.: US 10,584,002 B2
(45) Date of Patent: Mar. 10, 2020

(54) DISTRIBUTION FACILITY

(71) Applicant: Daifuku Co., Ltd., Osaka-shi (JP)

(72) Inventors: Yoshinori Shibata, Tokyo (JP); Hisashi Tsuji, Osaka (JP); Mitsugu Kamiya, Osaka (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/704,377

(22) Filed: Sep. 14, 2017

(65) Prior Publication Data

US 2018/0079607 A1 Mar. 22, 2018

(30) Foreign Application Priority Data

Sep. 16, 2016 (JP) .................... 2016-182201

(51) Int. Cl.
*B65G 67/02* (2006.01)
*B65G 63/02* (2006.01)

(52) U.S. Cl.
CPC .......... *B65G 67/02* (2013.01); *B65G 63/022* (2013.01)

(58) Field of Classification Search
CPC .............................. B65G 67/02; B65G 63/022
USPC ....... 414/389, 390, 392, 395, 396, 400, 458, 414/459
See application file for complete search history.

(56) References Cited

U.S. PATENT DOCUMENTS

| | | | | |
|---|---|---|---|---|
| 3,266,645 A | * | 8/1966 | McWilliams | B65G 67/02 414/347 |
| 4,027,823 A | * | 6/1977 | Kawarai | B66F 9/07 414/392 |
| 4,850,783 A | * | 7/1989 | Maekawa | B65G 1/1378 414/792.9 |
| 5,876,172 A | * | 3/1999 | Di Rosa | B65G 63/004 414/139.9 |
| 7,153,078 B2 | * | 12/2006 | Beerhalter | B61D 47/005 414/400 |
| 8,348,585 B2 | * | 1/2013 | Salmoiraghi | B65G 67/02 414/392 |
| 2004/0081540 A1 | * | 4/2004 | Uebach | B61D 47/00 414/395 |
| 2005/0158158 A1 | * | 7/2005 | Porta | B61D 47/00 414/392 |

FOREIGN PATENT DOCUMENTS

| | | | |
|---|---|---|---|
| JP | 6219929 U | | 2/1987 |
| JP | 62259927 A | | 11/1987 |
| JP | 63082235 A | * | 4/1988 |
| JP | 4159926 A | | 6/1992 |
| JP | 654643 U | | 7/1994 |

* cited by examiner

*Primary Examiner* — Kaitlin S Joerger
(74) *Attorney, Agent, or Firm* — The Webb Law Firm

(57) ABSTRACT

A distribution facility including: a platform that is provided with a first transport portion for shipping and a second transport portion for receiving; a berth that is provided to allow a transport vehicle to be parked side-on; and a transfer device that moves back and forth between an intermediate transport area and a load bed adjacent area to transfer an article between the platform and the transport vehicle.

11 Claims, 13 Drawing Sheets

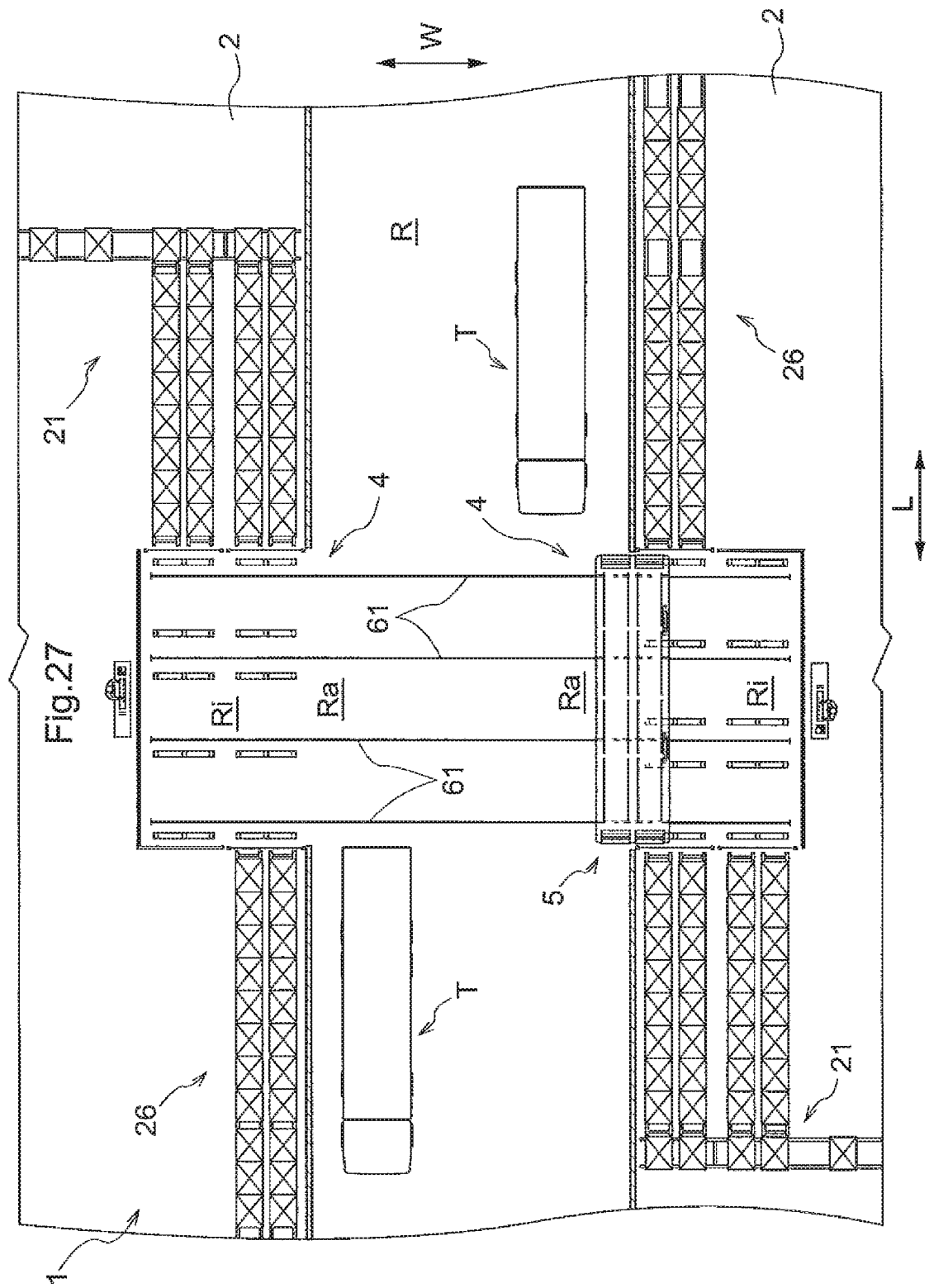

DISTRIBUTION FACILITY

CROSS-REFERENCE TO RELATED APPLICATION

This application claims priority to Japanese Patent Application No. 2016-182201 filed Sep. 16, 2016, the disclosure of which is hereby incorporated in its entirety by reference.

FIELD OF THE INVENTION

The present invention relates to a distribution facility that is used for the reception and shipment of articles.

BACKGROUND

For example, in order to receive materials that are to be used in a manufacturing facility such as a factory, and to ship products that have been manufactured, a distribution facility, which is provided along with the manufacturing facility, is used. In such a distribution facility, articles are sorted out on a platform, and are unloaded from a transport vehicle in a state where the transport vehicle is parked on a berth that is provided for the platform. In this regard, considering economic efficiency, it is necessary to improve the operation efficiency of the transport vehicle as much as possible.

To solve such a general problem, JP S62-19929U (Patent Document 1) and JP H4-159926A (Patent Document 2) disclose that a plurality of articles are unloaded all at once in a state where a plurality of articles are placed on one platform member. Also, JP S62-259927A (Patent Document 3), for example, discloses that articles are unloaded all at once in a state where a plurality of pallets, onto which articles are placed, are coupled to each other and integrated as one piece.

A berth of most conventional distribution facilities is provided for a platform such that transport vehicles can be parked in a lengthwise direction as typically shown in Patent Documents 1 to 3. This is because many transport vehicles are configured such that articles can be loaded and unloaded via an opening that is provided in the rear side of the load bed of each vehicle. Meanwhile, in recent years, transport vehicles that are provided with a so-called wing-type load bed and with which articles are loaded and unloaded via an opening that is provided in a lateral side of the load bed thereof are used as well. For such wing-type transport vehicles, a berth is provided along a platform edge of the platform such that transport vehicles can be parked side-on.

In such cases, it is preferable that a transport vehicle that has entered the distribution facility can keep travelling forward, can parked side-on, and then move away after articles have been loaded and unloaded, because this further improves the operation efficiency of the transport vehicle. However, generally, it is not easy to park a transport vehicle side-on on the berth with high positional accuracy. In particular, it is difficult to park a transport vehicle side-on so as to be parallel with the platform edge with almost no gap therebetween while operating a handle to avoid other vehicles stand by, for example. If it takes a long time to park a transport vehicle side-on, the operation efficiency of the transport vehicle decreases.

SUMMARY OF THE INVENTION

There is demand for improving the operation efficiency of transport vehicles in a distribution facility in which articles are received and shipped using transport vehicles that are to be parked side-on.

A distribution facility according to the present disclosure includes:

a platform that is provided with a first transport portion that transports articles that are to be shipped, and a second transport portion that transports articles that have been received;

a berth that is provided along a platform edge of the platform to allow a transport vehicle to be parked side-on; and a transfer device that moves back and forth between an intermediate transport area and a load bed adjacent area in the vehicle's widthwise direction to transfer articles between the platform and the transport vehicle, the intermediate transport area being located downstream of the first transport portion and upstream of the second transport portion, and the load bed adjacent area being adjacent to a load bed of the transport vehicle when the transport vehicle is parked on the berth.

With this configuration, a transfer device that moves back and forth in the vehicle's widthwise direction is provided, and the transfer device can be moved closer to the load bed of the transport vehicle that is parked on the berth. Therefore, if the driver of the transport vehicle can move the transport vehicle closer to the platform edge of the platform to a certain extent, the driver need not to be very concerned about the size of a gap originally formed, and the driver need only to park the transport vehicle so as to be parallel with the platform edge. Therefore, the driver can park the transport vehicle side-on in a short period of time without having to worry much.

Also, on the platform, an article can be transported to the intermediate transport area by the first transport portion, and an article can be transported from the intermediate transport area using the second transport portion. Therefore, an article that has been unloaded from the load bed of the transport vehicle and has been received by the transfer device can be transported to the intermediate transport area, and then taken out by the second transport portion, while an article that has been prepared can be transported into the transfer device that is located in the intermediate transport area, by the first transport portion, and then transported to the load bed adjacent area and loaded onto the load bed of the transport vehicle. The first transport portion, the second transport portion, and the transfer device cooperate with each other to smoothly perform this series of operations in a short period of time.

As described above, it is possible to park transport vehicles side-on in a short period of time, and to receive and ship articles in a short period of time. Therefore, the operation efficiency of the transport vehicles can be significantly improved.

Further features and advantages of the technique according to the present disclosure will become apparent from the following description of illustrative and non-limiting embodiments with reference to the drawings.

BRIEF DESCRIPTION OF THE DRAWINGS

FIG. 27 is a layout of a distribution facility according to another embodiment in plan view.

DETAILED DESCRIPTION

Figure 1:
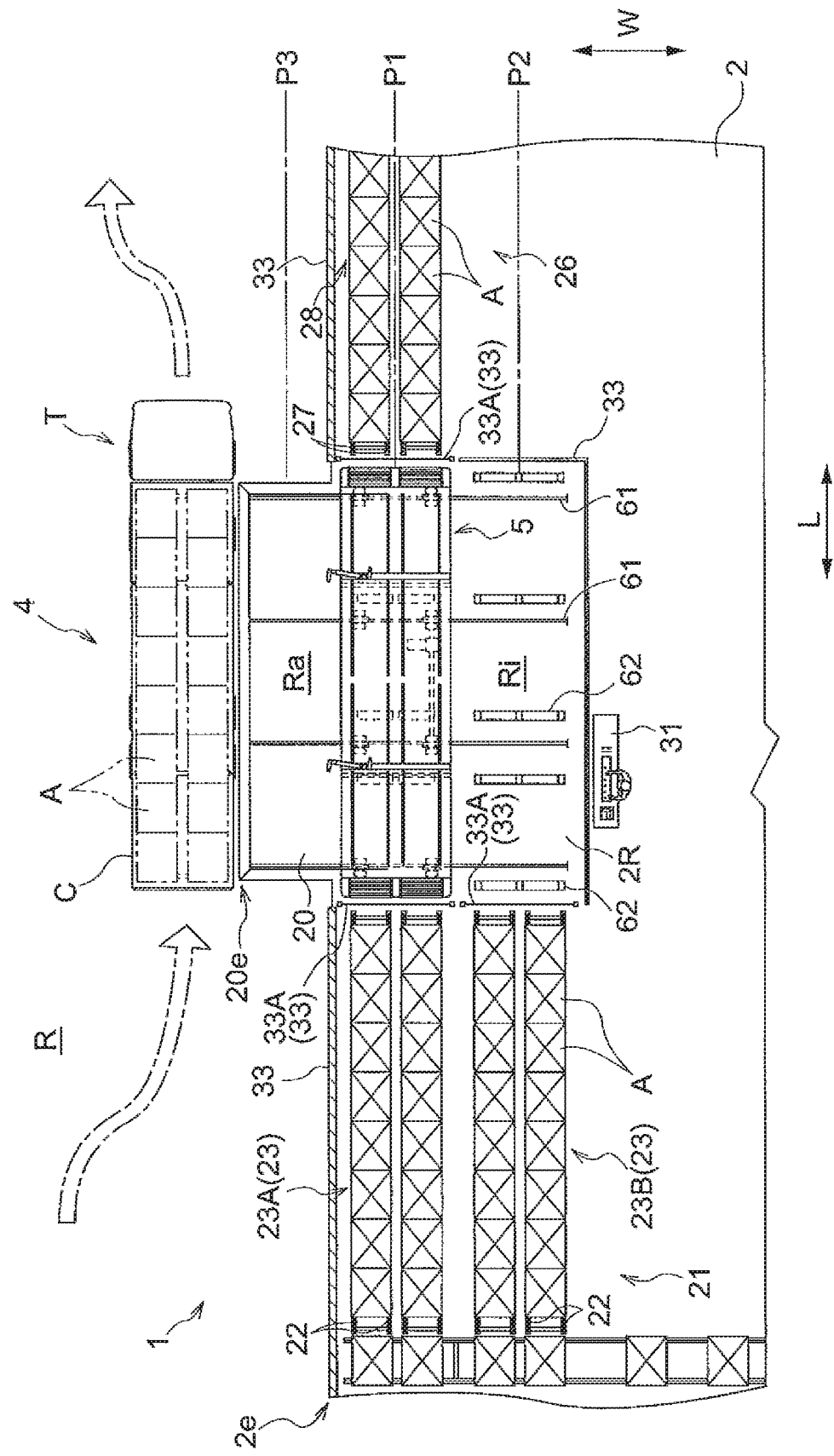
FIG. 1 is a layout of a distribution facility according to an embodiment in plan view.

The following describes an embodiment of the distribution facility. In the present embodiment, a distribution facility 1, which is provided along with the manufacturing facility such as a factory, will be described as an example. The distribution facility 1 according to the present embodiment is used to receive materials that are to be used in the manufacturing facility, and to ship products that have been manufactured. As shown in FIG. 1, the distribution facility 1 includes a platform 2 for sorting articles A, and a berth 4 that is provided for the platform 2. The distribution facility 1 also includes a transfer device 5 that moves back and forth in the vehicle's widthwise direction W between the platform 2 and a transport vehicle T that is parked on the berth 4. Articles are loaded and unloaded by the transfer device 5 in a state where the transport vehicle T is parked on the berth 4.

In the following description, "the vehicle's widthwise direction W" refers to the widthwise direction of the transport vehicle T in a state where the transport vehicle T is parked on the berth 4. Similarly, "the vehicle's front-rear direction L" refers to the front-rear direction of the transport vehicle T in a state where the transport vehicle T is parked on the berth 4.

The transport vehicle T is a truck, for example. The size (or the maximum loading weight) of the transport vehicle T is not specifically limited, and a transport vehicle T having any size, such as a medium-sized (e.g. 4 tons) truck or a large-sized truck (e.g. 11 tons), may be used. The transport vehicle T is provided with a load bed C for loading articles A thereon. The load bed C according to the present embodiment is configured to be of a so-called wing-type load bed in which both side surfaces of a box-shaped van body are openable. With such a wing-type transport vehicle T, articles A are loaded and unloaded via an opening that is provided in a lateral side of the load bed C. In the present embodiment, the transport vehicle T transports a plurality of articles A that are placed on a single base pallet B (see FIG. 2).

The berth 4 is provided along a platform edge 2e of the platform 2 such that the transport vehicle T can be parked side-on. To "park side-on" means to park the transport vehicle T such that the vehicle's front-rear direction L is parallel with the direction in which the platform edge 2e of the platform 2 extends. Since the berth 4 is provided in such a manner, the transport vehicle T that has entered through a travel path R can keep travelling forward and be parked on the berth 4 side-on. Unlike in the case where the transport vehicle T is parked in a lengthwise direction (the state where the vehicle's front-rear direction L of the transport vehicle T is orthogonal to the direction in which the platform edge 2e of the platform 2 extends), there is almost no need for the transport vehicle T to travel backward.

The platform 2 is a high-floor area of the distribution facility 1, of which the floor surface is set at a level that is higher than the ground surface. The height of the floor surface of the platform 2 with reference to the ground surface may be within the range of approximately 0.8 m to 1.5 m, for example. In the present embodiment, the platform 2 in plan view (viewed from above in a vertical direction) has a shape with a rectangular cutout portion. A berth forming deck 20 that has a rectangular shape in plan view is provided outside this cutout portion 2R so as to protrude from the platform edge 2e, which is the outer edge of the platform 2, toward the travel path R. The transfer device 5 moves back and forth between the cutout portion 2R and the berth forming deck 20 in the vehicle's widthwise direction W.

A deck edge 20e, which is the outer edge (on the side away from the platform 2) of the berth forming deck 20 is located closer to the travel path R than the platform edge 2e of the platform 2 and is parallel with the platform edge 2e. The berth 4 is provided outside the deck edge 20e, along the deck edge 20e. The transport vehicle T is parked on this berth 4 side-on to the platform 2 as described above. Here, since the deck edge 20e, at which the berth 4 is provided, is located closer to the travel path R than the platform edge 2e, it is easy to park the transport vehicle T side-on. Although FIG. 1 shows only one berth 4, a plurality of berths 4 may be provided along the travel path 4.

The platform 2 is provided with a first transport portion 21 and a second transport portion 26. An upstream end of the first transport portion 21 in the transport direction thereof is connected to the manufacturing facility, and a downstream end of the same faces the cutout portion 2R. The first transport portion 21 includes a conveyor 22 such as a chain conveyor, a belt conveyor, or a roller conveyor as a primary constituent element. The first transport portion 21 may further include a turn table, a stacking device, and so on. The first transport portion 21 transports articles A that are to be shipped. The articles A to be shipped are industrial products or semi-manufactured products that have been manufactured in the manufacturing facility, for example. In this example, the articles A are packed in boxes, placed on the pallet, and then supplied. The first transport portion 21 transports the articles A, which have been manufactured in the manufacturing facility and are to be shipped by the transport vehicle T, to the transfer device 5, which is provided in the cutout portion 2R of the platform 2.

In the present embodiment, the first transport portion 21 includes two shipping paths 23 (a first shipping path 23A and a second shipping path 23B) that are provided side by side and are parallel with each other. The first shipping path 23A and the second shipping path 23B have a length that is approximately N times (N is a natural number, and N=1 in this example) the length of the load bed C of a transport vehicle T that has the largest size (e.g. a large-sized truck with a maximum loading weight of 11 tons) among transport vehicles that may enter the distribution facility 1. The number of articles A that can be loaded onto the load beds C of 2×N transport vehicles T that have the above-described largest size are placed on the shipping paths 23 at maximum. Articles A that are to be shipped are sorted according to destination business place, and are to be placed on the shipping paths 23 before a transport vehicle T that transports the articles A arrives at the distribution facility 1.

An upstream end of the second transport portion 26 in the transport direction thereof faces the cutout portion 2R, and a downstream end of the same is connected to the manufacturing facility. The second transport portion 26 includes a conveyor 27 such as a chain conveyor, a belt conveyor, or a roller conveyor as a primary constituent element. The second transport portion 26 may further include a table lift, an unstacking device, and so on. The second transport portion 26 transports articles A that have been received. The articles A that have been received may be materials that are supplied for the manufacturing of various products in the manufacturing facility or semi-manufactured products, for example. In these cases, the articles A are packed in boxes, placed on the pallet, and then supplied. Alternatively, the articles A that have been received may be empty boxes placed on the pallet. The second transport portion 26 transports articles A that have been transported thereto by a transport vehicle T that has arrived, and have been received by the transfer device 5, to the manufacturing facility.

In the present embodiment, the second transport portion 26 includes a receiving path 28 that has a size corresponding to the load bed C of a transport vehicle T that has the above-described largest size. The receiving path 28 is provided along the platform edge 2e so as to be aligned with one shipping path (the first shipping path 23A) of the two shipping paths 23 of the first transport portion 21. The received articles A on the load bed C of one transport vehicle T are transported to the receiving path 28 of the second transport portion 26. The second transport portion 26 transports the received articles A to the manufacturing facility one by one.

The platform 2 is provided with an operation console 31. An operator operates a computer that is provided in the operation console 31 to input operation commands to the first transport portion 21 and the second transport portion 26, or input operation commands to the transfer device 5. The platform 2 is also provided with safety fences 33. The safety fences 33 are provided all across the platform edge 2e including the edges of the cutout portion 2R. A safety fence 33 that faces a downstream end of the shipping path 23 of the first transport portion 21 and a safety fence 33 that faces an upstream end of the shipping path 28 of the second transport portion 26 are movable fences 33A that are configured to open and close by sliding in the vertical direction. The other safety fences 33 are fixed fences that cannot be opened or closed. The safety fences 33A open when articles A are transported from the first transport portion 21 to the transfer device 5, or when articles A are transported from the transfer device 5 to the second transport portion 26.

The transfer device 5 is provided to transfer articles A between the platform 2 and the transport vehicle T that is parked on the berth 4. The transfer device 5 is provided so as to move back and forth in the vehicle's widthwise direction W over an area that spans the cutout portion 2R of the platform 2 and the berth forming deck 20 that is continuous from the cutout portion 2R. The cutout portion 2R of the platform 2 is provided between the downstream end of the first transport portion 21 and the upstream end of the second transport portion 26, and the area in which the cutout portion 2R is provided is referred to as "the intermediate transport area Ri" in the present embodiment. The berth forming deck 20 is adjacent to the load bed C of a transport vehicle T that is parked on the berth 4, and the area in which the berth forming deck 20 is formed is referred to as "the load bed adjacent area Ra" in the present embodiment. Note that the load bed adjacent area Ra may contain a portion of the cutout portion 2R that is on the berth forming deck 20 side so that the intermediate transport area Ri and the load bed adjacent area Ra overlap each other. Thus, the transfer device 5 is provided so as to move back and forth in the vehicle's widthwise direction W between the intermediate transport area Ri and the load bed adjacent area Ra. Also, the transfer device 5 according to the present embodiment is configured to transfer a plurality of articles A that are placed on the single base pallet B to and from the transport vehicle T all at once.

Figure 2:
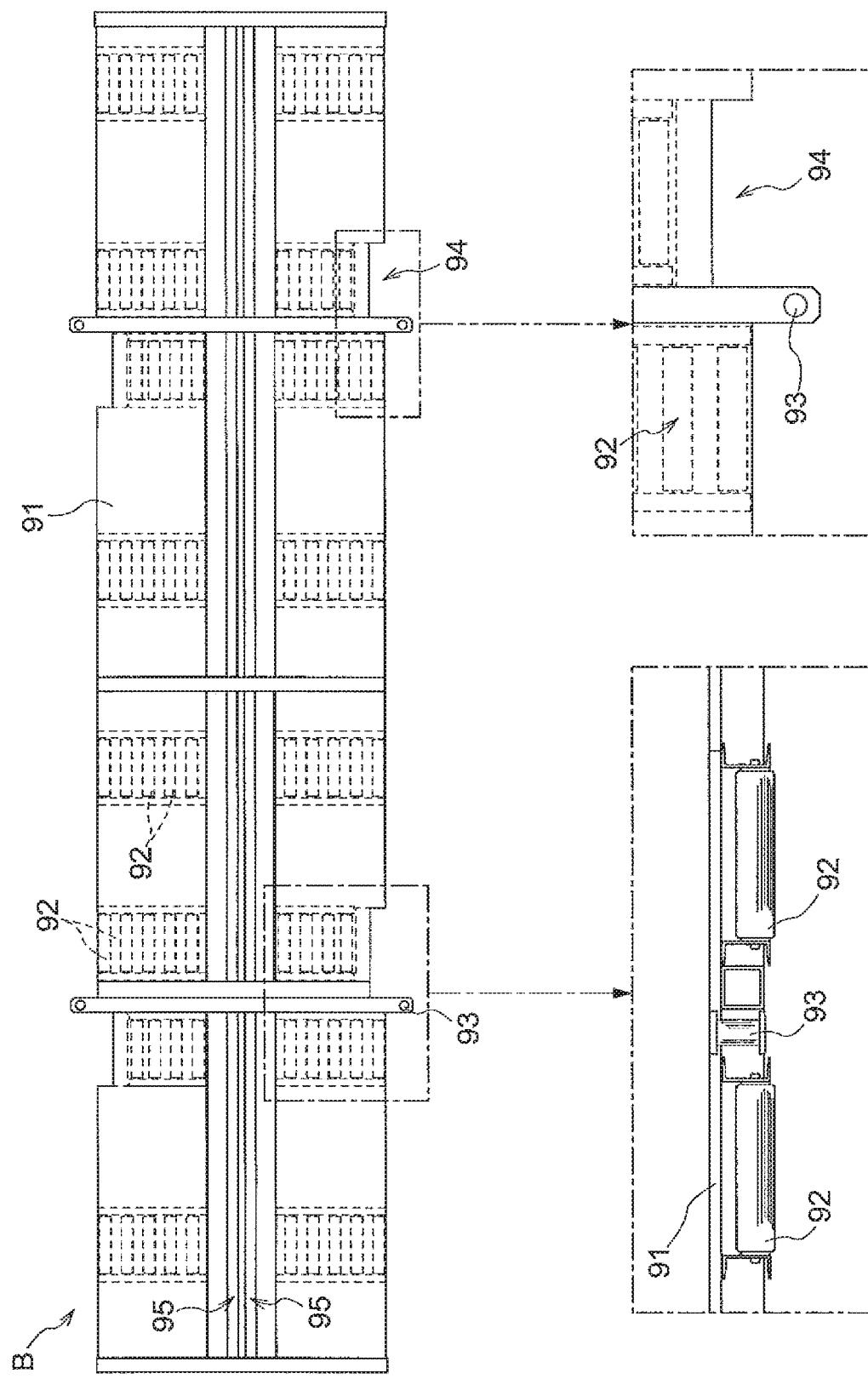
FIG. 2 is a plan view (including a partial enlarged view and a partial side view) of a base pallet.

As shown in FIG. 2, the base pallet B has a flat rectangular shape in plan view. The base pallet B has a shape that has approximately the same size as the size of the load bed C of the transport vehicle T. In the present embodiment, each transport vehicle T is always accompanied by the same single base pallet B except when the transfer device 5 is performing a transfer operation. If the load beds C of a plurality of transport vehicles T have the same size, the base pallets B respectively corresponding thereto have the same size, and if the load beds C have different sizes, the base pallets B respectively corresponding thereto have different sizes. Note that the sizes of the load beds C of the transport vehicles T and the sizes of the base pallets B are determined by adjusting the length thereof in the lengthwise direction (which coincides with the vehicle's front-rear direction L of the transport vehicles T, the same applies to the following description) while keeping the length thereof in the widthwise direction (which coincides with the vehicle's widthwise direction W of the transport vehicles T, the same applies to the following description) to be approximately the same.

The base pallet B includes a main portion 91 that supports articles A that are placed thereon, and rollers 92 that are each rotatable about a shaft. The main portion 91 is formed by combining a plurality of frame members that each extend in the lengthwise direction and the widthwise direction of the base pallet B. A plurality of rollers 92 are provided, which are arranged in a row in the widthwise direction such that the shafts extend in the lengthwise direction at a plurality of positions in the lengthwise direction. Lower ends of the rollers 92 protrude further downward than the lower surface of the main portion 91.

The base pallet B has lock-target portions 93 that each have a columnar shape and extend in the vertical direction, respectively at plurality of positions (two positions in this example) in the lengthwise direction. The lock-target portions 93 are located outside the frame members that constitute the main portion 91 on both sides in the widthwise direction. Retracted portions 94 are formed at positions in the lengthwise direction of the main portion 91 that are respectively adjacent to the lock-target portions 93. The retracted portions 94 are formed in the frame members that constitute the main portion 91 on both sides in the widthwise direction, so as to be recessed toward a central portion in the widthwise direction in plan view. Locking claws 53f (examples of locking portions) of hook portions 53E that are provided for a sliding portion 53 that is included in the transfer device 5 are hooked to the lock-target portions 93 of the base pallet B. The hook portions 53E rotate, and thus the locking claws 53f are locked to the lock-target portions 93. At this time, the locking claws 53f pass through the retracted portions 94 that are located at bases of the lock-target portions 93, and thus the locking claws 53f are prevented from interfering with the main portion 91.

The base pallet B has a pair of slits 95 near a central portion thereof in the widthwise direction, which extend in the lengthwise direction.

Figure 3:
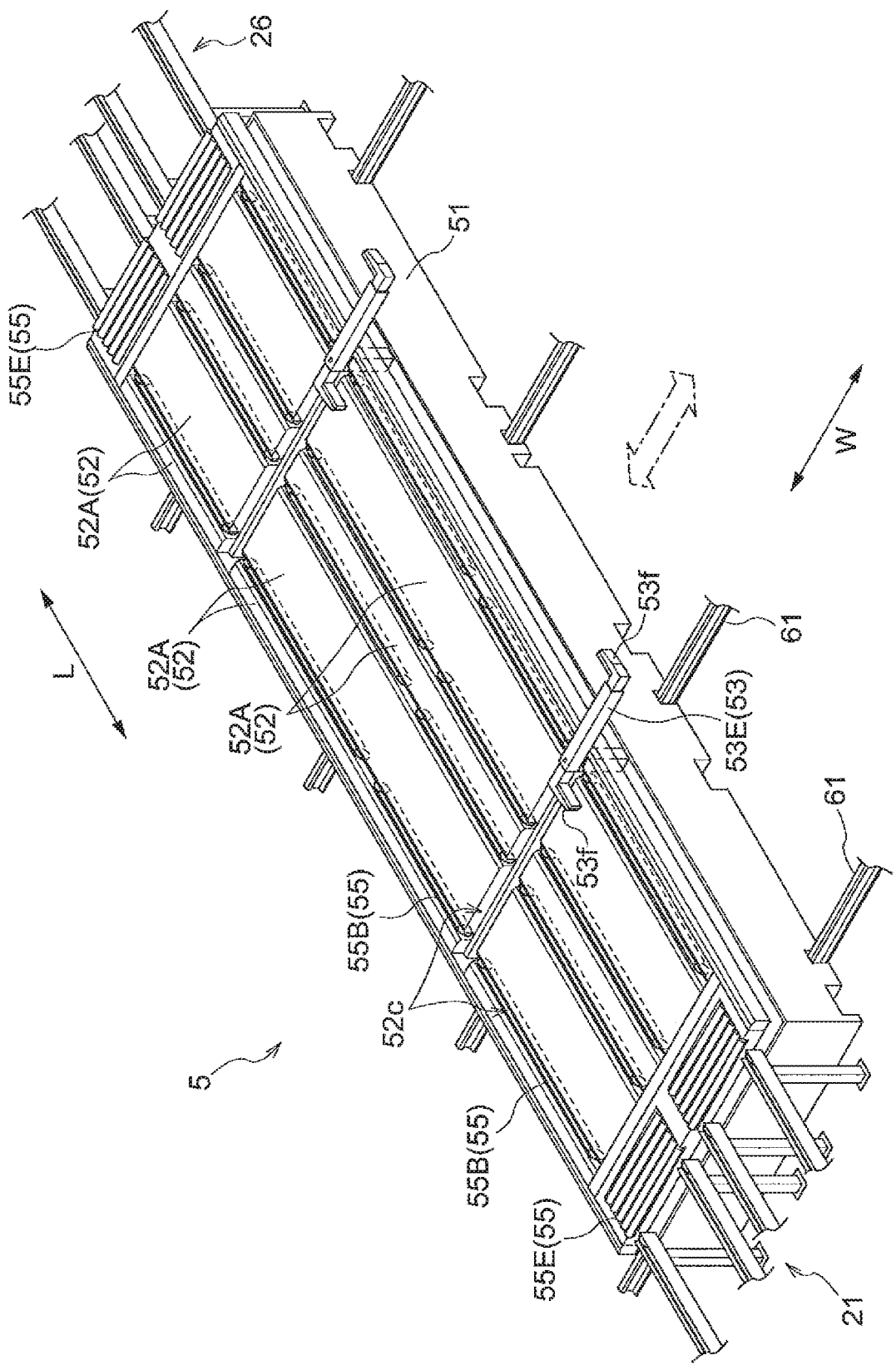
FIG. 3 is a perspective view of a transport device.
Figure 4:
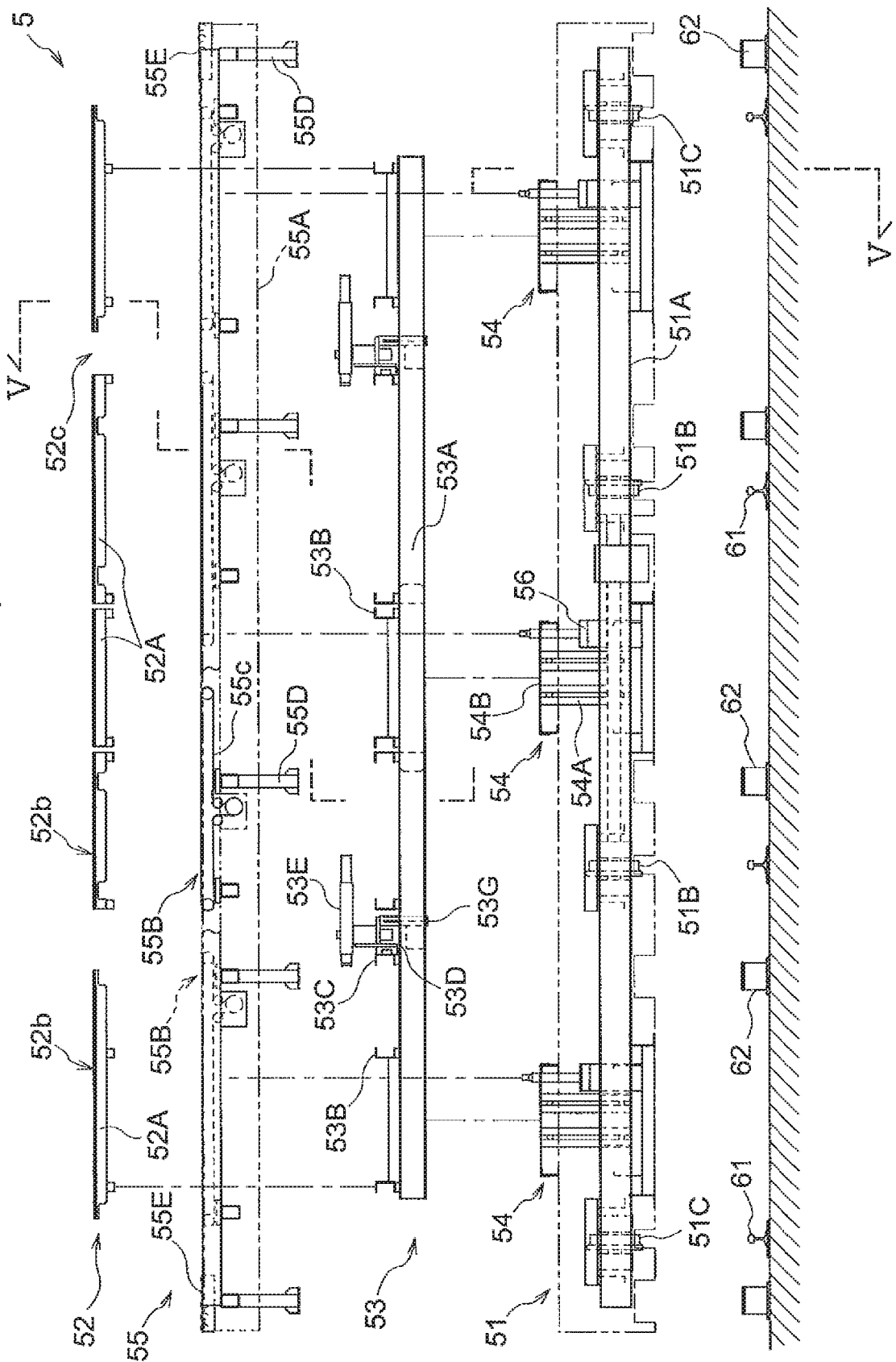
FIG. 4 is an exploded cross-sectional view of the transport device.
Figure 5:
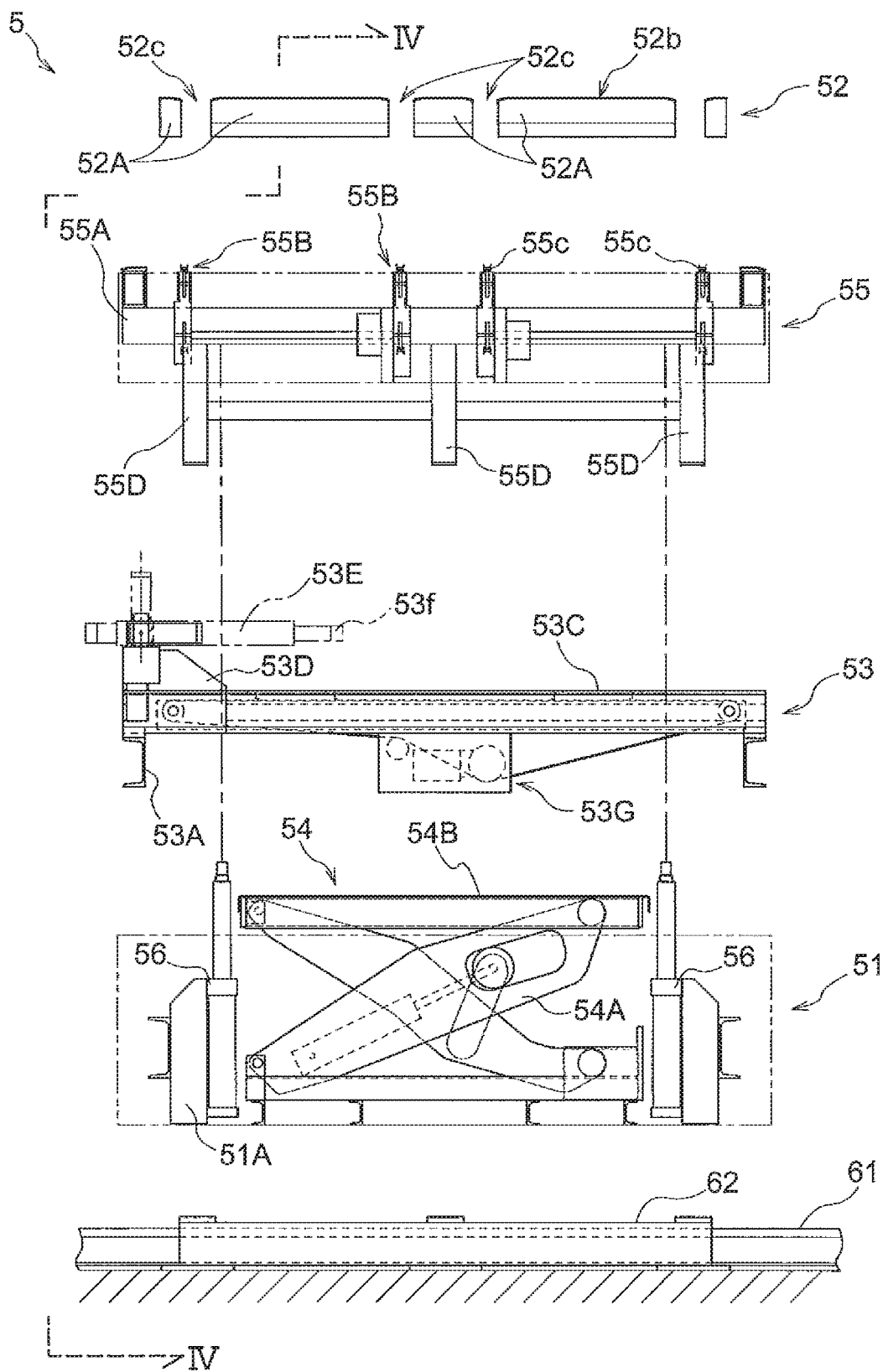
FIG. 5 is an exploded cross-sectional view of the transport device.

As shown in FIGS. 3 to 5, the transfer device 5 includes a travelling portion 51, a supporting portion 52, a sliding portion 53, lift portions 54, and a conveyor unit 55 as primary constituent elements. The travelling portion 51 travels along travel rails 61 that are provided in the vehicle's widthwise direction W. The travel rails 61 are provided on the ground surface so as to span the cutout portion 2R of the platform 2 and the berth forming deck 20. The travel rails 61 are provided at a plurality of positions (four positions in this example) in the lengthwise direction of the transfer device 5, so as to extend in the vehicle's widthwise direction W in parallel with each other. The travelling portion 51 includes a travelling portion's main portion 51A and driving wheels 51B and tracker wheels 51C that are supported by the travelling portion's main portion 51A so as to be rotatable about shafts. The driving wheels 51B and the tracker wheels 51C each rotate on the travelling rails 61. The driving wheels 51B are driven by a driving motor (not shown) that is provided for the travelling portion's main portion 51A, to rotate (normal rotation or reverse rotation) and provide the travelling portion 51 with a propulsion force. The tracker wheels 51C are idle when the travelling portion 51 travels. The components that constitute the travelling portion 51 are housed in a casing.

The supporting portion 52 supports other objects from below. The supporting portion 52 supports, from below, the base pallet B on which articles A are placed. The supporting portion 52 is constituted by a plurality of supporting decks 52A that each have a supporting surface 52b, which is a flat surface. The plurality of supporting decks 52A are arranged so as to form the same flat surface with gaps 52c that each have a predetermined size extending in the lengthwise direction and the widthwise direction of the transfer device 5. A gap 52c between adjacent supporting decks 52A serves as an area within which a hook supporting member 53D that constitutes a sliding portion 53 can move, or an area within which a chain 55c of a chain conveyor 55B that constitutes the conveyor unit 55 is arranged. The plurality of supporting decks 52A are respectively placed on and fixed to deck supporting members 53B that are provided on the sliding portion 53, from above.

The sliding portion 53 slides in the vehicle's widthwise direction W relative to the supporting portion 52. The sliding portion 53 includes: a frame member 53A that has a rectangular frame-like shape; the deck supporting members 53B and hook guides 53C that are fixed to the frame member 53A; hook portions 53E that are supported by hook supporting members 53D; and chain driving mechanisms 53G that drive to slide the hook supporting members 53D along the hook guides 53C. The supporting decks 52A are placed on and fixed to the deck supporting members 53B from above. The hook guides 53C are respectively provided so as to extend in the vehicle's widthwise direction W in parallel with each other, at a plurality of positions (two positions in this example) in the lengthwise direction of the transfer device 5. The hook supporting members 53D, and the hook portions 53E supported thereby are guided by the hook guides 53C, and are thus slidable in the vehicle's widthwise direction W.

The hook portions 53E each have locking claws 53f that respectively extend from the two ends of a rod-shaped member in opposite directions (see FIG. 3). The hook portions 53E are each rotatable about a shaft that extends in the vertical direction. This rotation is controlled by a driving motor (not shown). Due to the rotation of the hook portions 53E about the above-described shafts, the locking claws 53f and the lock-target portions 93 of the base pallet B are interlocked with each other, or unlocked from each other. Note that the hook portions 53E (the locking claws 53f) may be brought into a state where the heads thereof are simply in contact with the base pallet B.

The chain driving mechanisms 53G are locked to the hook supporting members 53D, and each include an endless chain that is wound around a plurality of sprockets, and a driving motor (not shown) that drives one of the plurality of sprockets to rotate (normal rotation or reverse rotation). The reference position of the hook supporting members 53D is the rear end of the transfer device 5 (the end on the platform 2 side), and the hook portions 53E move forward toward the front end (the end on the transport vehicle T side) as the driving motors drive normally, and the hook portions 53E move backward toward the rear end as the driving motors reversely rotate. Here, for example, if the driving motors are reversely driven in a state where the locking claws 53f are locked to the lock-target portions 93 of the base pallet B, the base pallet B can be taken from the load bed C of the transport vehicle T. Also, if the driving motors are normally driven in a state where the heads of the locking claws 53f are in contact (an example of locking) with the base pallet B, the base pallet B can be pushed onto the load bed C of the transport vehicle T.

The lift portions 54 are provided on the travelling portion 51, and raise and lower the sliding portion 53 and the supporting portion 52 that is fixed thereto. In the present embodiment, the lift portions 54 are formed as scissor lifts 54A of a pantograph arm type. The scissor lifts 54A, which are the lift portions 54, are provided for the travelling portion's main portion 51A. Each scissor lift 54A raises and lowers a lift platform 54B by opening and closing the pantograph arms using the propulsion force of a cylinder that is provided between the pantograph arms. Since the sliding portion 53 and the supporting portion 52 fixed thereto are placed on and fixed to the lift platforms 54B, the scissor lifts 54A can raise and lower the sliding portion 53 and the supporting portion 52 between a lower limit position PL (see FIGS. 6 and 8) and an upper limit position PU (see FIG. 7).

In the present embodiment, the transfer device 5 is further provided with hydraulic lifts 56 that are provided for the travelling portion 51 and raise and lower the conveyor unit 55. The hydraulic lifts 56 raise and lower the conveyor unit 55 that is fixed to a leading end of a piston rod, using hydraulic cylinders that are provided in the vertical direction. The scissor lifts 54A and the hydraulic lifts 56 cooperate with each other to raise and lower the supporting portion 52, the sliding portion 53, and the conveyor unit 55.

The scissor lifts 54A and the hydraulic lifts 56 are provided such that two hydraulic lifts 56 are provide on both sides of one scissor lift 54A in the vehicle's widthwise direction W (see FIG. 5). One lift portion 54 includes such a set composed of one scissor lift 54A and two hydraulic lifts 56, and three lift portions 54 are dispersedly provided at a plurality of positions (three positions in this example) in the lengthwise direction of the transfer device 5 (see FIG. 4).

The conveyor unit 55 is configured to transport articles A in a direction (the vehicle's front-rear direction L) that is orthogonal to the vehicle's widthwise direction W. The conveyor unit 55 includes a frame member 55A, chain conveyors 55B that are fixed to the frame member 55A, and a plurality of supporting columnar members 55D that support the frame member 55A and the chain conveyors 55B from below. Each chain conveyor 55B includes a pair of left and right endless chains 55c. The pair of left and right endless chains 55c are synchronously driven by a driving motor. The pair of left and right endless chains 55c are arranged in the vehicle's front-rear direction L. In the present embodiment, a plurality of chain conveyors 55B are aligned in the widthwise direction and the lengthwise direction of the transfer device 5. Each supporting deck 52A included in the supporting portion 52 is provided so as to be housed in a space between the pair of left and right chains 55c of an individual chain conveyor 55B, or a space between chain conveyors 55B that are adjacent to each other in the widthwise direction. From another point of view, the chains 55c of each chain conveyor 55B are arranged so as to be housed in a gap 52c between supporting decks 52A that are adjacent to each other in the widthwise direction.

In the present embodiment, the conveyor unit 55 has auxiliary conveyors 55E respectively at the two ends thereof in the lengthwise direction. The auxiliary conveyors 55E can be formed as roller conveyors, and may be driving type roller conveyors.

The conveyor unit 55 is fixed to leading ends of the piston rods of the hydraulic lifts 56. Here, the scissor lifts 54A, which constitute the lift portions 54, and the hydraulic lifts 56 are basically configured to operate in synchronization with each other, and are also able to operate independent of each other. If the scissor lifts 54A and the hydraulic lifts 56 operate synchronizing with each other, then the supporting portion 52, the sliding portion 53, and the conveyor unit 55 are raised and lowered all at once. If the scissor lifts 54A and the hydraulic lifts 56 operate without being in synchronization with each other, then the conveyor unit 55 can be moved in the vertical direction relative to the supporting portion 52 and the sliding portion 53.

In the present embodiment, a position at which the transfer device 5, which moves back and forth in the vehicle's widthwise direction W between the intermediate transport area Ri and the load bed adjacent area Ra, is aligned in a straight line with the first shipping path 23A for the first transport portion 21 and the receiving path 28 for the second transport portion 26 in the intermediate transport area Ri is defined as "the first position P1" (see FIG. 1). A position at which the transfer device 5 is aligned in a straight line with the second shipping path 23B for the first transport portion 21 in the intermediate transport area Ri is defined as "the second position P2". Also, the forward limit position of the movement of the transfer device 5 in the load bed adjacent area Ra is defined as "the third position P3".

In the present embodiment, mounts 62 that each have a rectangular parallelepiped shape with a predetermined height are provided on the ground surface at positions respectively corresponding to the positions of the supporting columnar members 55D of the conveyor unit 55 when the transfer device 5 is located at the first position P1 and the second position P2 in the intermediate transport area Ri. When the hydraulic lifts 56 lower the conveyor unit 55, each supporting columnar member 55D is placed on the corresponding mount 62. Here, the scissor lifts 54A, which are the lift portions 54, are lowered to the lower limit positions PL when the hydraulic lifts 56 have stopped moving downward, and consequently the chains 55c of the chain conveyors 55B included in the conveyor unit 55 protrude upward from the supporting surfaces 52b of the supporting portion 52 (see FIG. 8). Thus, the conveyor unit 55 is configured to protrude upward from the supporting surfaces 52b of the supporting portion 52 when the transfer device 5 is located at the first position P1 or the second position P2 in the intermediate transport area Ri and the lift portions 54 have moved downward to the lower limit position PL. The first position P1 and the second position P2 in the present embodiment each correspond to "the specific position".

The conveyor unit 55 is configured to protrude upward from the supporting surfaces 52b of the supporting portion 52 by a length that corresponds to the thickness of the base pallet B when the transfer device 5 is located at the first position P1 or the second position P2 and the lift portions 54 have moved downward to the lower limit position PL. Specifically, the conveyor unit 55 is configured to protrude upward from the supporting surfaces 52b of the supporting portion 52 by a length that is equal to the thickness of the base pallet B plus a predetermined margin (clearance). Therefore, even if the base pallet B is placed on the supporting portion 52, the conveyor unit 55 protrudes upward from the upper surfaces of the base pallet B on the supporting portion 52 when the transfer device 5 is located at the first position P1 or the second position P2 and the lift portions 54 have moved downward to the lower limit position PL. Note that, at this time, the chains 55c of the chain conveyors 55B pass through the slits 95 in the base pallet B and protrude upward from the upper surface of the base pallet B.

Figure 6:
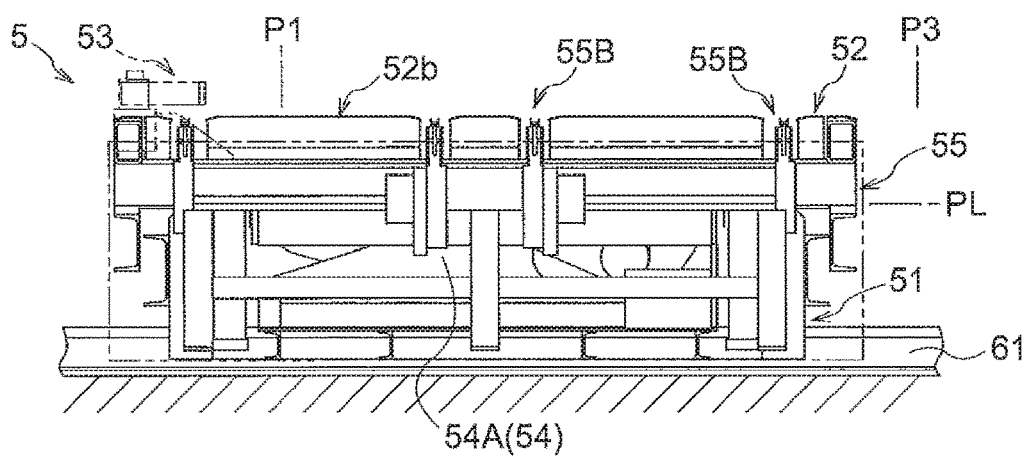
FIG. 6 is a diagram showing the transport device in a first state.
Figure 7:
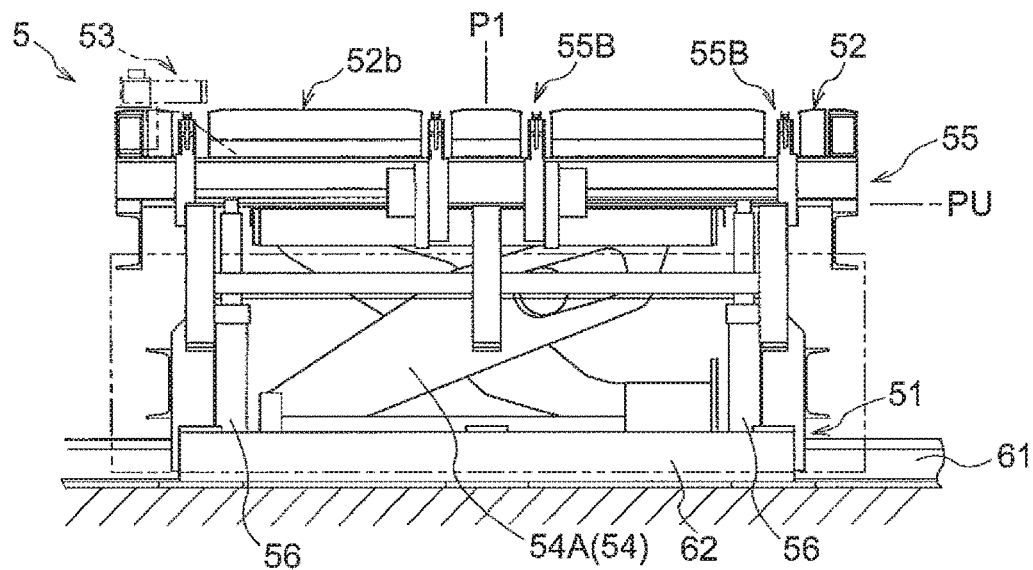
FIG. 7 is a diagram showing the transport device in a second state.
Figure 8:
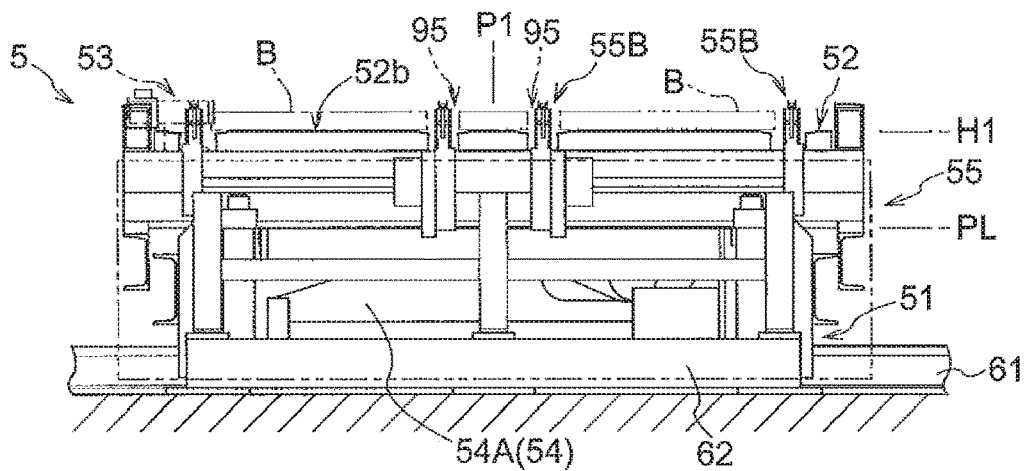
FIG. 8 is a diagram showing the transport device in a third state.

On the other hand, the chains 55c of the chain conveyors 55B included in the conveyor unit 55 are housed in the gaps 52c between the supporting decks 52A that are adjacent to one another when the lift portions 54 have risen to the upper limit position PU or when the transfer device 5 is located at a position other than the first position P1 or the second position P2 despite the lift portions 54 having moved downward to the lower limit position PL (see FIGS. 6 and 7). Thus, the conveyor unit 55 is configured to be located below the supporting surfaces 52b of the supporting portion 52 when the transfer device 5 is located at a position other than the first position P1 or the second position P2 in the intermediate transport area Ri.

In the following description, a state in which the lift portions 54 are located at the lower limit position PL and the supporting columnar members 55D of the conveyor unit 55 are not placed on the mounts 62 (the state shown in FIG. 6) is referred to as "the first state". A state in which the lift portions 54 are located at the upper limit position PU (the state shown in FIG. 7) is referred to as "the second state". A state in which the lift portions 54 are located at the lower limit position PL and the supporting columnar members 55D of the conveyor unit 55 are placed on the mounts 62 (the state shown in FIG. 8) is referred to as "the third state".

In the transfer device 5 according to the present embodiment, the lift portion 54 is configured to move upward and downward to switch the height of the supporting surfaces 52b of the supporting portion 52 to a first height H1 set depending on the height of the supporting surfaces of the first transport portion 21 and the second transport portion 26, and a second height H2 set depending on the height of the supporting surface of the load bed C of the transport vehicle T. The height of the supporting surfaces of the first transport portion 21 and the second transport portion 26 is the height of the transporting surfaces of the conveyors 22 and 27. The height of the supporting surface of the load bed C is the height of the floor surface of the load bed C of the transport vehicle T that is parked on the berth 4.

The first height H1 is set within a range of approximately ±10 mm from a point that is lower than the supporting surfaces of the first transport portion 21 and the second transport portion 26 by the thickness of the base pallet B. In this example, a height that is approximately 5 mm lower than the point that is lower than the supporting surfaces of the first transport portion 21 and the second transport portion 26 by the thickness of the base pallet B is set as the first height H1. In the present embodiment, in the third state (the state shown in FIG. 8), the height of the supporting surfaces of the first transport portion 21 and the second transport portion 26 (the height of the transporting surfaces of the conveyors 22 and 27) is equal to the height of the supporting surface of the conveyor unit 55 (the height of the transporting surfaces of the chain conveyors 55B), and the height of the supporting surfaces 52b of the supporting portion 52 is the first height H1. In this case, even if the base pallet B is placed on the transfer device 5 in the third state, the chains 55c of the conveyor unit 55 protrude upward by approximately 5 mm from the base pallet B.

The conveyor unit 55 (the chain conveyors 55B) transports articles A that are transported from the first transport portion 21 onto the transfer device 5 when the transfer device 5 is located at the first position P1 or the second position P2 in the intermediate transport area Ri. Also, the conveyor unit 55 (the chain conveyors 55B) transports articles A on the transfer device 5 to the second transport portion 26 when the transfer device 5 is located at the first position P1.

The second height H2 is set within a range of approximately ±15 mm from the supporting surface of the load bed C. In the case, the second height H2 when the base pallet B is taken from the load bed C and that when the base pallet B is pushed onto the load bed C may be set to be different. In this example, a height that is approximately 10 mm lower than the supporting surface of the load bed C is set as the second height H2 when the base pallet B is taken out, and a height that is approximately 10 mm higher than the supporting surface of the load bed C is set as the second height H2 that when the base pallet B is pushed onto the load bed C.

Figure 9:
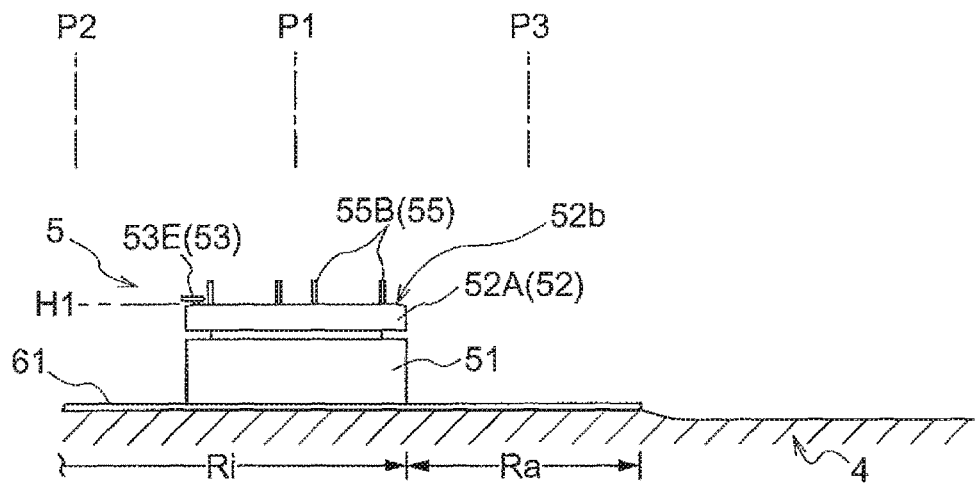
FIG. 9 is a schematic diagram showing one aspect of loading and unloading of articles in the distribution facility.

The following describes procedures for receiving and shipping articles A in the distribution facility 1 according to the present embodiment. In the following description, a state in which the transfer device 5 is located at the first position P1 in the intermediate transport area Ri and the lift portions 54 have moved downward to the lower limit position PL (see FIG. 9) is assumed to be the initial state. In this initial state, the transfer device 5 is in the third state (the state shown in FIG. 8) at the first position P1. In the present embodiment, the height of the supporting surfaces 52b of the supporting portion 52 is set to be equal to the first height H1 in the third state. In the initial state, the hook portions 53E are orientated such that the shafts thereof extend in the lengthwise direction of the transfer device 5.

Figure 10:
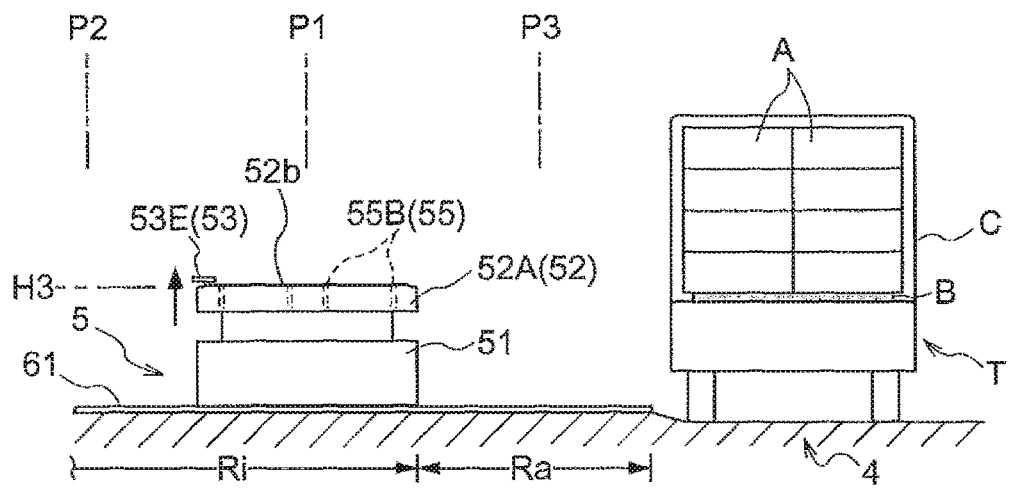
FIG. 10 is a schematic diagram showing one aspect of loading and unloading of articles in the distribution facility.

In this state, upon the arrival of a transfer vehicle T on which articles A (e.g. empty boxes or materials packed in boxes placed on the pallet) are loaded, the lift portions 54, as shown in FIG. 10, raise the supporting portion 52 so that the height of the supporting surfaces 52b of the supporting portion 52 equals the third height H3, which is higher than the second height H2. Here, the third height H3 is set to, for example, a height that is higher than the supporting surface of the load bed C of the transport vehicle T by approximately 50 mm±15 mm. In the following description, this state is referred to as "the fourth state". This height adjustment may be performed without having to worry much.

Figure 11:
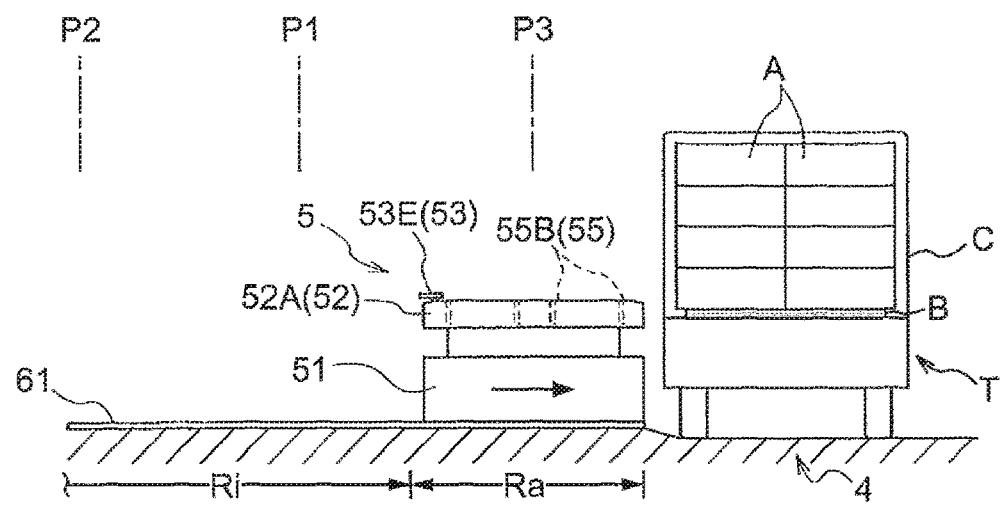
FIG. 11 is a schematic diagram showing one aspect of loading and unloading of articles in the distribution facility.
Figure 12:
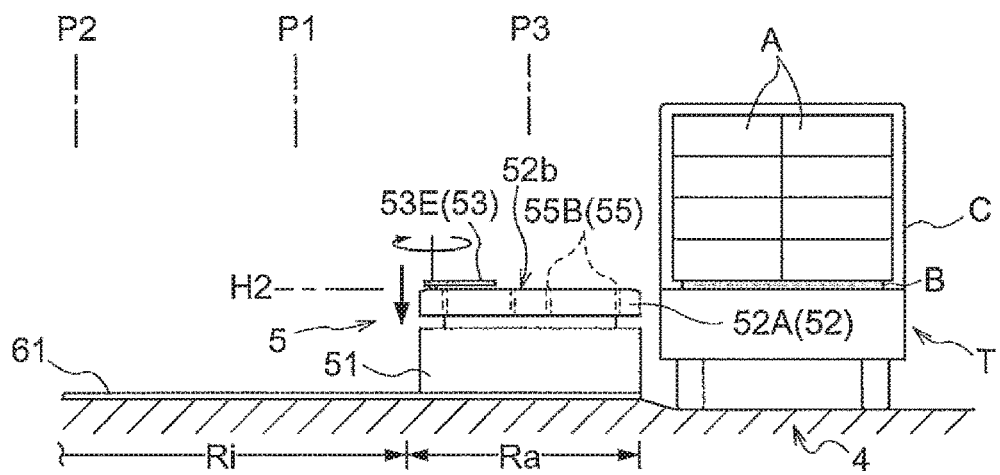
FIG. 12 is a schematic diagram showing one aspect of loading and unloading of articles in the distribution facility.

Next, as shown in FIG. 11, the transfer device 5 in the fourth state travels along the travel rails 61 that are provided in the vehicle's widthwise direction W to be closer to the transport vehicle T. The transfer device 5 moves forward to the forward limit position to reach the third position P3 in the load bed adjacent area Ra, and then, as shown in FIG. 12, the lift portions 54 lower the supporting portion 52 to set the supporting surfaces 52b thereof at the second height H2. Since this is a preparation for taking the base pallet B from the load bed C, the supporting surfaces 52b of the supporting portion 52 is set at a height that is approximately 10 mm lower than the supporting surface of the load bed C. Note that this height adjustment can be performed by detecting a detection target portion that is attached to a portion of the load bed C of the transport vehicle T (e.g. a reflection plate that is attached to an inner surface of a gate), using a sensor (e.g. a laser sensor) that is attached to an outer surface of the casing of the travelling portion 51 that is included in the transfer device 5. Also, the hook portions 53E rotate by 90°, and the shafts thereof are orientated so as to extend in the widthwise direction of the transfer device 5 (the vehicle's widthwise direction W).

Figure 13:
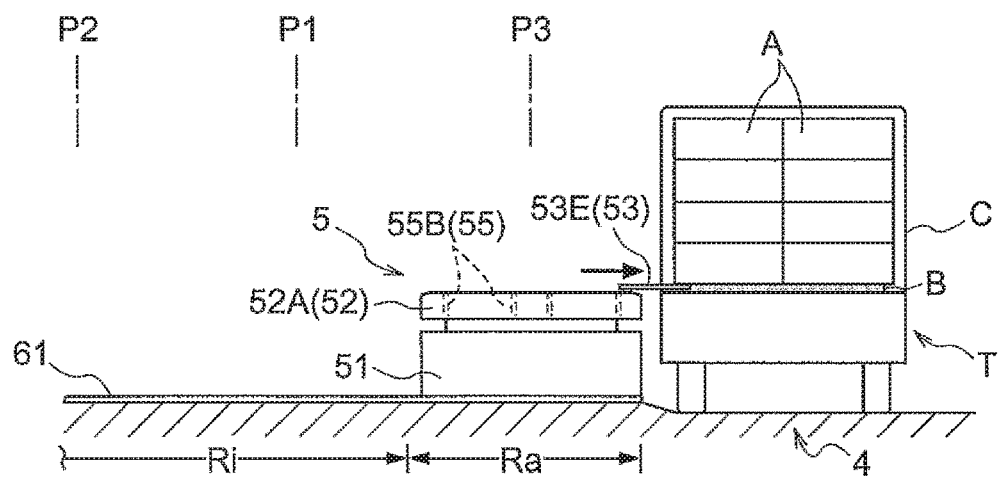
FIG. 13 is a schematic diagram showing one aspect of loading and unloading of articles in the distribution facility.
Figure 14:
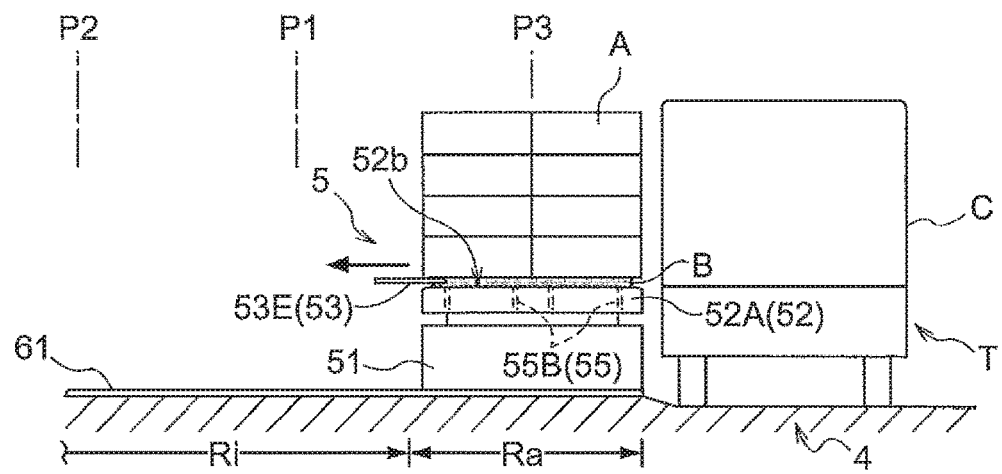
FIG. 14 is a schematic diagram showing one aspect of loading and unloading of articles in the distribution facility.

Next, the chain driving mechanisms 53G (see FIG. 5 and so on) are normally driven, and, as shown in FIG. 13, the hook portions 53E are moved forward so as to be closer to the base pallet B. In this state, the claws 53f (see FIG. 3) of the hook portions 53E are hooked to the lock-target portions 93 (see FIG. 2) of the base pallet B, using automatic control or a manual operation by an operator. Thereafter, the chain driving mechanisms 53G are reversely driven with the claws 53f being hooked to the lock-target portions 93, to move the hook portions 53E backward and taking the base pallet B from the load bed C of the transport vehicle T, as shown in FIG. 14. At this time, a plurality of articles A placed on the base pallet B are taken from the load bed C all at once. Since the base pallet B has the rollers 92 on the lower surface side (see FIG. 2), the base pallet B can be smoothly taken out with little resistance.

Figure 15:
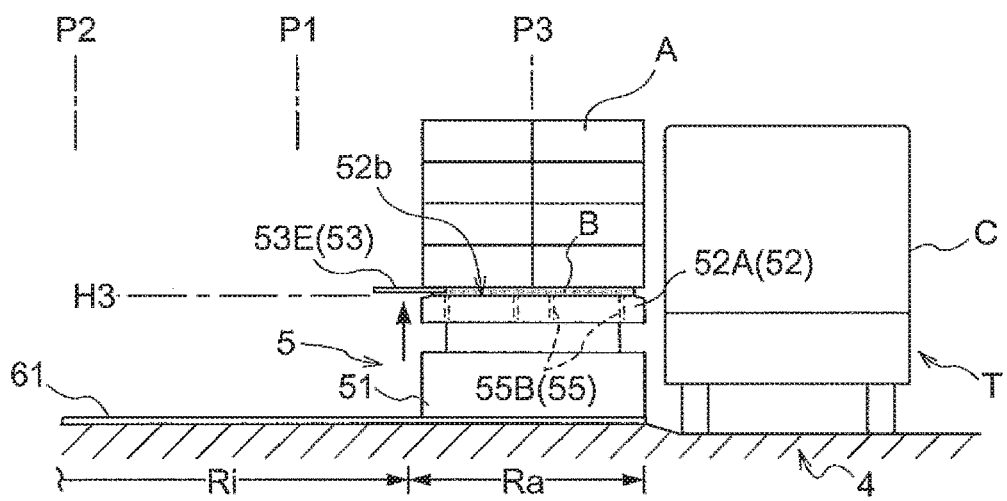
FIG. 15 is a schematic diagram showing one aspect of loading and unloading of articles in the distribution facility.
Figure 16:
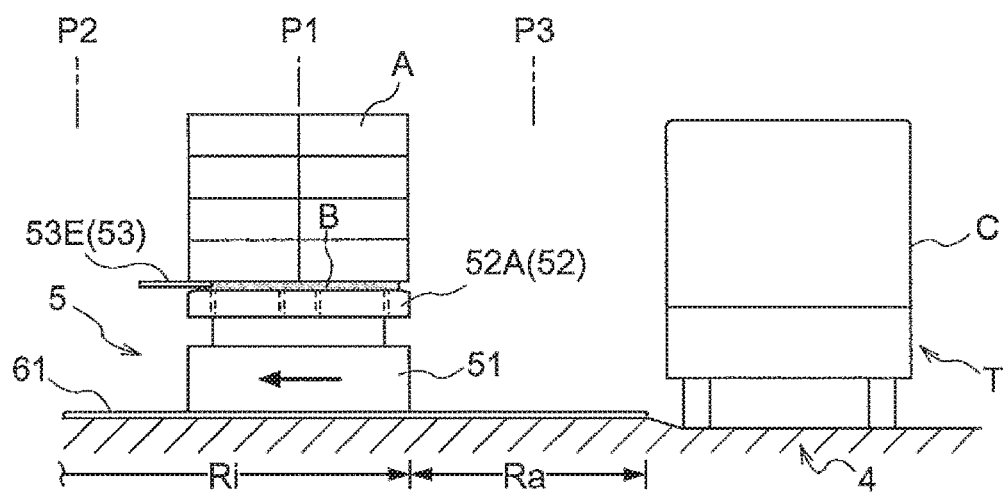
FIG. 16 is a schematic diagram showing one aspect of loading and unloading of articles in the distribution facility.
Figure 17:
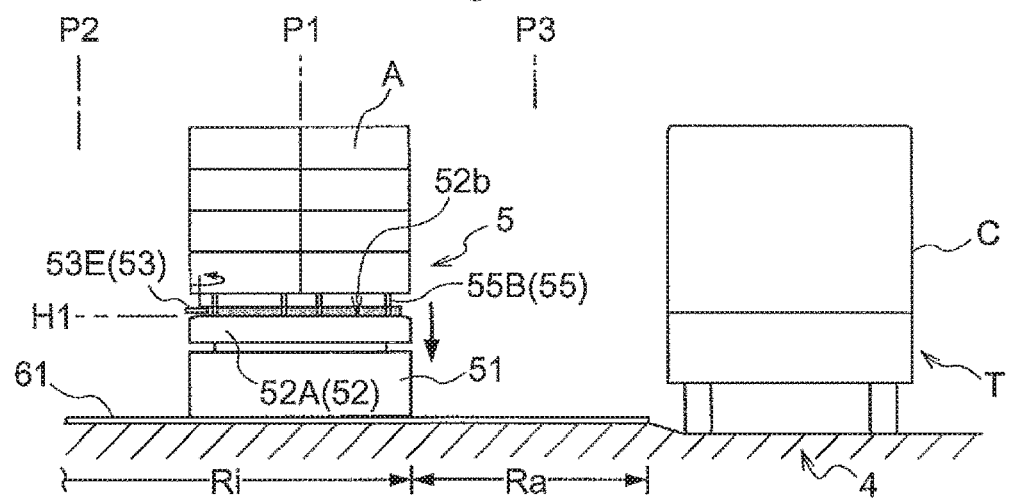
FIG. 17 is a schematic diagram showing one aspect of loading and unloading of articles in the distribution facility.

Next, as shown in FIG. 15, the lift portions 54 raise the supporting portion 52 to set the supporting surfaces 52b thereof at the third height H3. Thereafter, as shown in FIG. 16, the transfer device 5 in the fourth state travels along the travel rails 61 away from the transport vehicle T. The transfer device 5 travels to the first position P1 in the intermediate transport area Ri. Thereafter, as shown in FIG.

17, the lift portions 54 lower to the lower limit position PL to set the supporting surfaces 52*b* of the supporting portion 52 at the first height H1. At this time, at the first position P1, the supporting columnar members 55D of the conveyor unit 55 are placed on the mounts 62. Therefore, the transfer device 5 is in the third state, and the chains 55*c* of the chain conveyors 55B of the conveyor unit 55 protrude upward from the base pallet B. Also, the hook portions 53E rotate by 90°, and the shafts thereof are orientated so as to extend in the lengthwise direction of the transfer device 5.

Figure 18:
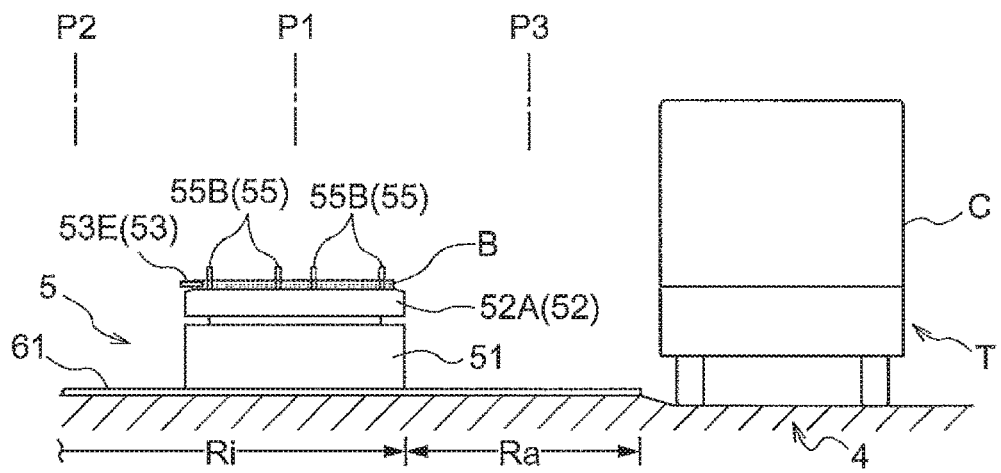
FIG. 18 is a schematic diagram showing one aspect of loading and unloading of articles in the distribution facility.

Next, the safety fence 33 that is located downstream of the transfer device 5 in the transport direction is opened, and the chain conveyor 55B and the conveyor 27 of the second transport portion 26 are operated to transport the plurality of articles A that are directly placed on the chain conveyors 55B to the second transport portion 26. The plurality of articles A are moved away from the base pallet B that remains on the supporting portion 52, and are transported to the second transport portion 26 (see FIG. 18).

Figure 19:
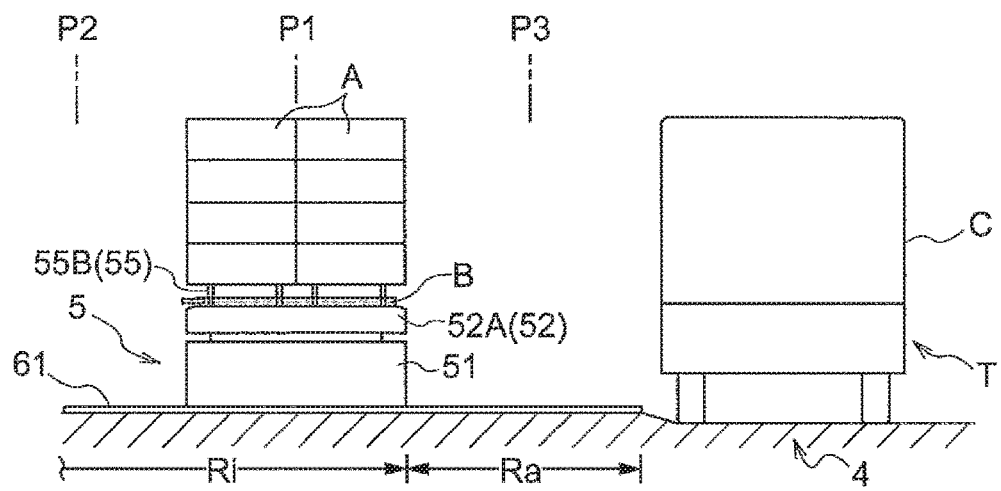
FIG. 19 is a schematic diagram showing one aspect of loading and unloading of articles in the distribution facility.

Upon completion of unloading, the safety fence 33 that is located upstream of the transfer device 5 in the transport direction is opened, and the conveyor 23 of the first transport portion 21 and the chain conveyor 55B are operated to transport the plurality of articles A that are awaiting shipment on the first shipping path 23A of the first transport portion 21 (industrial products packed in boxes and placed on the pallet, for example) are transported to the transfer device 5. Note that the plurality of articles A that are to be transported from the first transport portion 21 have been sorted out by the operator and are ready on the first shipping path 23A before the transport vehicle T that is to transport the articles A arrives at the distribution facility 1. The plurality of articles A are transported to a position that is directly above the base pallet B remaining on the supporting portion 52 of the transfer device 5 since the previous process (see FIG. 19).

Figure 20:
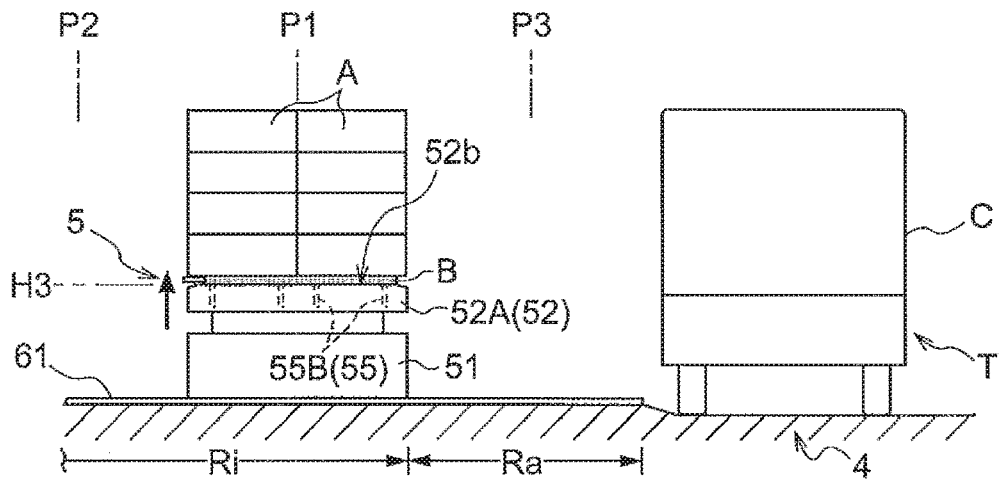
FIG. 20 is a schematic diagram showing one aspect of loading and unloading of articles in the distribution facility.
Figure 21:
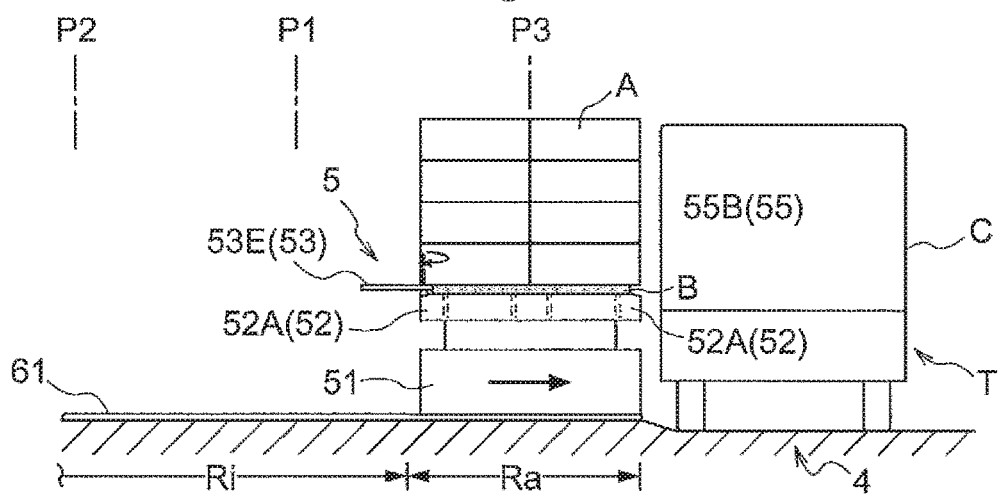
FIG. 21 is a schematic diagram showing one aspect of loading and unloading of articles in the distribution facility.
Figure 22:
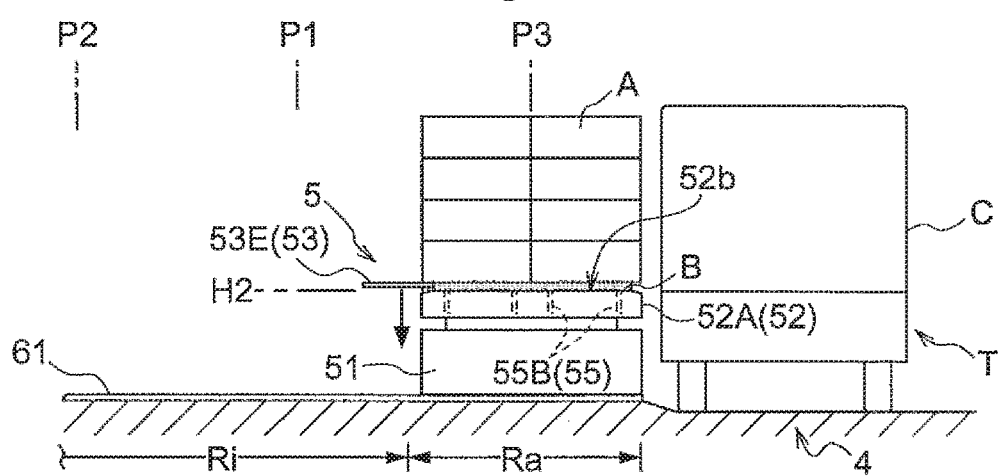
FIG. 22 is a schematic diagram showing one aspect of loading and unloading of articles in the distribution facility.

Upon completion of transportation of the plurality of articles A, as shown in FIG. 20, the lift portions 54 raise the supporting portion 52 to set the supporting surfaces 52*b* thereof at the third height H3. Next, as shown in FIG. 21, the transfer device 5 in the fourth state travels along the travel rails 61 to be closer to the transport vehicle T. The transfer device 5 moves forward to the forward limit position to reach the third position P3 in the load bed adjacent area Ra, and then, as shown in FIG. 22, the lift portions 54 lower the supporting portion 52 to set the supporting surfaces 52*b* thereof at the second height H2. Since this is a preparation for pushing the base pallet B onto the load bed C, the supporting surfaces 52*b* of the supporting portion 52 is set at a height that is approximately 10 mm higher than the supporting surface of the load bed C. Also, the hook portions 53E rotate by 90°, and the shafts thereof are orientated so as to extend in the widthwise direction of the transfer device 5 (the vehicle's widthwise direction W). Then, the heads of the hook portions 53E are brought into contact with the base pallet B.

Figure 23:
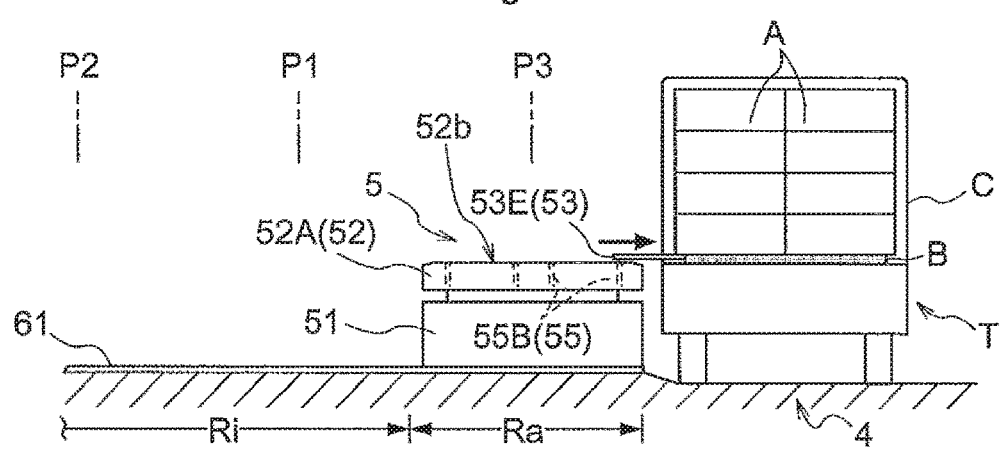
FIG. 23 is a schematic diagram showing one aspect of loading and unloading of articles in the distribution facility.
Figure 24:
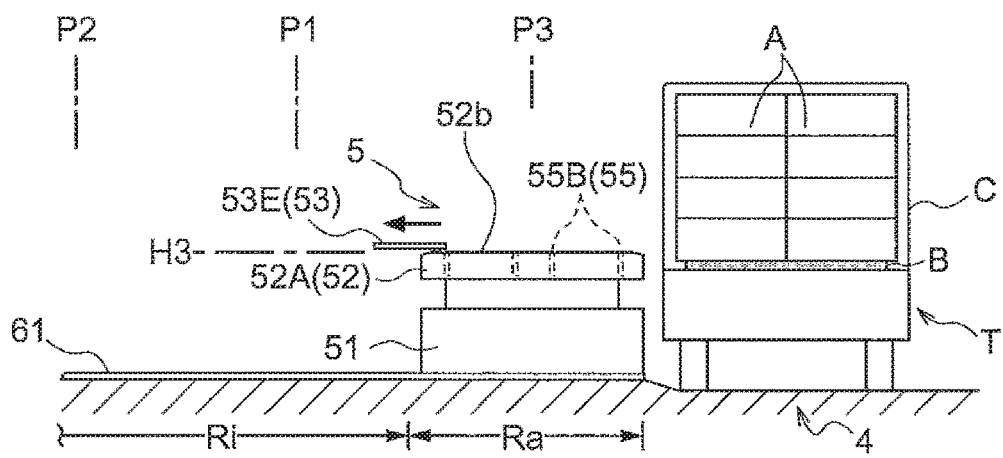
FIG. 24 is a schematic diagram showing one aspect of loading and unloading of articles in the distribution facility.

Next, the chain driving mechanisms 53G (see FIG. 5 and so on) are normally driven, and, as shown in FIG. 23, the hook portions 53E are moved forward so as to be closer to the base pallet B, to push the base pallet B onto the load bed C of the transport vehicle T. At this time, the plurality of articles A placed on the base pallet B are pushed onto the load bed C all at once. Since the base pallet B has the rollers 92 on the lower surface side (see FIG. 2), the base pallet B can be smoothly pushed with little resistance. After the base pallet B on which the plurality of articles A are placed has been completely transferred onto the load bed C, the chain driving mechanisms 53G reversely rotate, and, as shown in FIG. 24, the hook portions 53E are moved backward to the backward limit position. Also, the lift portions 54 raise the supporting portion 52 to set the supporting surfaces 52*b* thereof at the third height H3. The transport vehicle T on which articles are loaded departs for the destination business place when ready.

Figure 25:
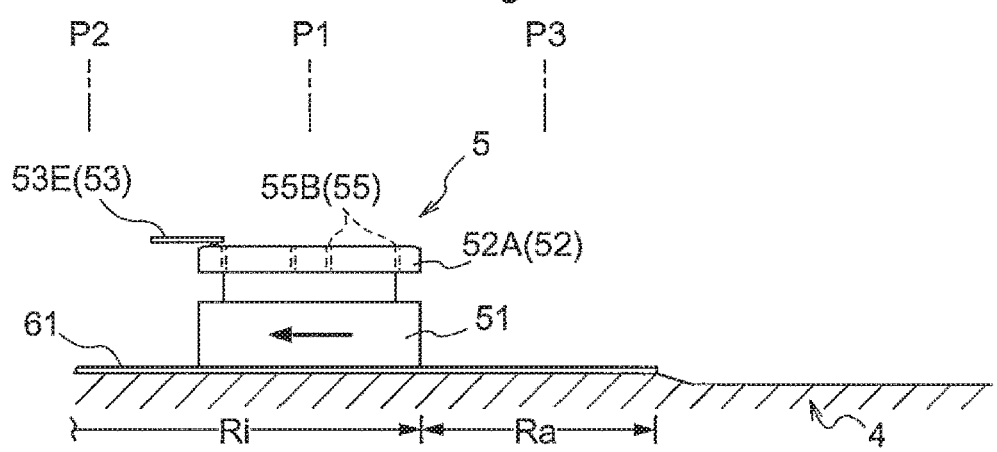
FIG. 25 is a schematic diagram showing one aspect of loading and unloading of articles in the distribution facility.
Figure 26:
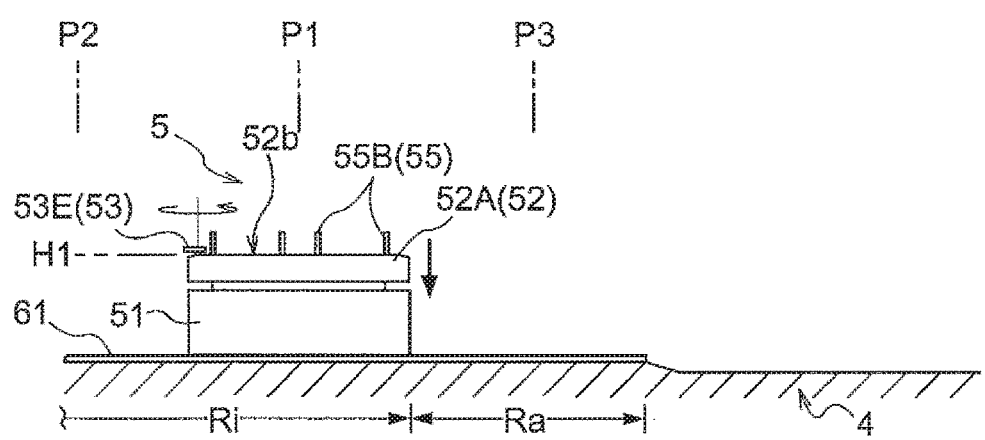
FIG. 26 is a schematic diagram showing one aspect of loading and unloading of articles in the distribution facility.

Next, as shown in FIG. 25, the transfer device 5 in the fourth state travels along the travel rails 61 away from the transport vehicle T. The transfer device 5 travels to the first position P1 in the intermediate transport area Ri. Thereafter, as shown in FIG. 26, the lift portions 54 lower to the lower limit position PL to set the supporting surfaces 52*b* of the supporting portion 52 at the first height H1. Also in this case, the supporting columnar members 55D of the conveyor unit 55 are placed on the mounts 62, and the transfer device 5 is in the third state. In this case, the chains 55*c* of the chain conveyors 55B included in the conveyor unit 55 protrude upward from the supporting surfaces 52*b* of the supporting portion 52 by a length that is greater than or equal to the thickness of the base pallet B. Thus, the initial state is restored, and the arrival of the next transport vehicle T is awaited.

The distribution facility 1 according to the present embodiment is provided with the transfer device 5 that travels back and forth in the vehicle's widthwise direction W. Therefore, even in the case where a wing-type transport vehicle T is parked side-on, the transfer device 5 can move closer to the load bed C to fill the gap with the load bed C. Therefore, the driver of the transport vehicle T need not to park the transport vehicle T side-on so as to be parallel with the platform edge 2*e* of the platform 2 with almost no gap therebetween, and the driver can park the transport vehicle T side-on in a short period of time without having to worry much. Also, since such a transfer device 5 is provided between the second transport portion 26 that transports articles A that have been received and the first transport portion 21 that transports articles A that are to be shipped, loading and unloading can be continuously performed while the transport vehicle T is parked. These operations are automated and can be efficiently performed in a short period of time. For example, unloading and loading can be performed within 10 minutes from when one transport vehicle T stops to when the transport vehicle T starts again. It is possible to sort articles on the platform 2 without using a forklift, and therefore the distribution facility 1 is safe for operators working on the platform 2.

Other Embodiments (1) In the above-described embodiment, the second height 112 of the supporting surfaces 52*b* of the supporting portion 52 are set to different heights when the base pallet B is taken from the load bed C and when the base pallet B is pushed onto the load bed C. However, the present invention is not limited to such a configuration, and, for example, the second height H2 may be the same (specifically, the height that is the same as the height of the supporting surface of the load bed C) when the base pallet B is taken from the load bed C and when the base pallet B is pushed onto the load bed C.

(2) In the above-described embodiment, a configuration in which the base pallet B has the rollers 92 on the lower surface side has been described as an example. However, the present invention is not limited to such a configuration, and, for example, the base pallet B may be configured without the rollers 92. If this is the case, when the base pallet B is transferred between the transfer device 5 and the load bed C, the base pallet B slides along the supporting surfaces 52*b* of the supporting portion 52 and the floor surface of the load bed C.

(3) In the above-described embodiment, a configuration in which the berth 4 is formed along the berth forming deck 20 that is provided near the platform edge 2*e* of the platform 2 has been described as an example. However, the present invention is not limited to such a configuration, and, for example, the berth 4 may be formed in any manner.

(4) In the above-described embodiment, a configuration in which the transfer device 5 includes the travelling portion 51, the supporting portion 52, the sliding portion 53, the lift portions 54, and the conveyor unit 55 has been described as an example. These constituent elements have been described while specific configurations have been shown. However, the present invention is not limited to such a configuration, and, the transfer device 5 may have any specific configuration.

(5) In the above-described, it is mainly assumed that the transfer device 5 receives and ships articles A using the first shipping path 23A of the first transport portion 21 and the receiving path 28 of the second transport portion 26 while moving back and forth between the first position P1 and the third position P3, and procedures therefor have been described based on such an assumption. However, the present invention is not limited to such a configuration, and, of course, the transfer device 5 may receive and ship articles A using the second shipping path 23B of the first transport portion 21 and the receiving path 28 of the second transport portion 26. If this is the case, the transfer device 5 that has received the base pallet B (articles A) from the load bed C and has transported the articles A to the second transport portion 26 at the first position P1 receives articles A from the second shipping path 23B of the first transport portion 21, and then passes the base pallet B (the articles A) to the load bed C at the third position P3.

(6) In the above-described embodiment, a configuration in which the first transport portion 21 is provided with two shipping paths 23 has been described as an example. However, the present invention is not limited to such a configuration, the first transport portion 21 may be provided with only one shipping path 23, or three or more shipping paths 23. Also, the second transport portion 26 is not limited to a configuration with only one receiving path 28, and the second transport portion 26 may be provided with two or more receiving paths 28.

(7) In the above-described embodiment, the distribution facility 1 that has a configuration in which the platform 2 is provided on only one side of the travel path R has been described. However, the present invention is not limited to such a configuration, and, as shown in FIG. 27 for example, the present technology is applicable to a distribution facility 1 that is provided with a pair of platforms 2 on both sides of the travel path R, the pair of platforms 2 facing each other with the travel path R therebetween. In the distribution facility 1 with such a configuration, the transfer device 5 is configured to move back and forth in the vehicle's widthwise direction W between the respective intermediate transport areas Ri of the pair of platforms 2. That is, the transfer device 5 is shared between the pair of platforms 2. The transfer device 5 is configured to exchange articles A between one of the platforms 2 and a transport vehicle T that is parked on the berth 4 corresponding thereto, and between the other of the platforms 2 and a transport vehicle T that is parked on the berth 4 corresponding thereto.

(8) The configurations disclosed in the above-described embodiments (the embodiment and the other embodiments above, the same applies to the following) may be combined with the configurations disclosed in the other embodiments and applied as long as no inconsistencies occur. Regarding other configurations, the embodiments disclosed in the present description are merely examples in all aspects, and may be modified as appropriate without departing from the spirit of the present disclosure.

SUMMARY OF EMBODIMENTS

In summary, a distribution facility according to the present disclosure is preferably provided with the following configurations.

A distribution facility comprising:

a platform that is provided with a first transport portion that transports articles that are to be shipped and a second transport portion that transports articles that have been received;

a berth that is provided along a platform edge of the platform to allow a transport vehicle to be parked side-on; and a transfer device that moves back and forth between an intermediate transport area and a load bed adjacent area in the vehicle's widthwise direction to transfer articles between the platform and the transport vehicle, the intermediate transport area being located downstream of the first transport portion and upstream of the second transport portion, and the load bed adjacent area being adjacent to a load bed of the transport vehicle when the transport vehicle is parked on the berth.

With this configuration, the transfer device that moves back and forth in the vehicle's widthwise direction is provided, and the transfer device can be moved closer to the load bed of the transport vehicle that is parked on the berth. Therefore, if the driver of the transport vehicle can move the transport vehicle closer to the platform edge of the platform to a certain extent, the driver need not to be very much aware of the size of a gap as originally formed, and the driver need only to park the transport vehicle so as to be parallel with the platform edge. Therefore, the driver can park the transport vehicle side-one in a short period of time without very much care.

Also, on the platform, an article can be transported to the intermediate transport area by the first transport portion, and an article can be transported from the intermediate transport area using the second transport portion. Therefore, an article that has been unloaded from the load bed of the transport vehicle and has been received by the transfer device can be transported to the intermediate transport area, and then taken out by the second transport portion, while an article that has been prepared can be transported into the transfer device that is located in the intermediate transport area, by the first transport portion, and then transported to the load bed adjacent area and loaded onto the load bed of the transport vehicle. The first transport portion, the second transport portion, and the transfer device cooperate with each other to smoothly perform this series of operations in a short period of time.

As described above, it is possible for transport vehicles to park side-on in a short period of time, and to receive and ship articles in a short period of time. Therefore, the operation efficiency of the transport vehicles can be significantly improved.

In one aspect, it is preferable that transfer device transfers a plurality of articles that are placed on a single base pallet, all at once.

With this configuration, the process in which articles are unloaded from the load bed of a transport vehicle and the process in which articles are loaded onto the load bed of the transport vehicle can each be performed with a single operation. Therefore, it is possible to smoothly transfer articles between the transport vehicle and the transfer device in a short period of time, and it is possible to further improve the operation efficiency of the transport vehicle.

In another aspect, it is preferable that the transfer device includes: a travelling portion that travels along a travel rail that is provided in the vehicle's widthwise direction; a supporting portion that supports, from below, the base pallet on which the articles are placed; a sliding portion that slides in the vehicle's widthwise direction relative to the supporting portion, in a state of being locked to the base pallet; and a lift portion that is provided for the travelling portion and raises and lowers the sliding portion and the supporting portion, and the lift portion is configured to move upward and downward to switch the height of a supporting surface of the supporting portion to a first height set depending on the height of supporting surfaces of the first transport portion and the second transport portion, and a second height set depending on the height of a supporting surface of the load bed of the transport vehicle.

With this configuration, it is possible to appropriately move the transfer device including the travelling portion and the supporting portion back and forth in the vehicle's widthwise direction along the travel rail. Also, by sliding the sliding portion in the state of being locked to the base pallet on which articles are placed, it is possible to take the base pallet from the load bed of the transport vehicle and unload the articles using the base pallet. Conversely, by pushing the base pallet, it is possible to load articles onto the load bed of the transport vehicle using the base pallet. Furthermore, even if there is a difference between the height of the supporting surfaces of the first transport portion and the second transport portion on the platform side and the height of the supporting surface of the load bed of the transport vehicle, it is possible to absorb the difference by moving the lift portion upward and downward at least between the first height and the second height. Therefore, it is possible to smoothly transfer articles between the transfer device and the first transport portion and the second transport portion, and between the transfer device and the load bed of the transport vehicle.

In another aspect, it is preferable that the transfer device further includes a conveyor unit that is configured to transport the articles in a direction that is orthogonal to the vehicle's widthwise direction, and the conveyor unit is configured to move in a vertical direction relative to the supporting portion, and to protrude upward from the supporting surface of the supporting portion when the transfer device is located at a specific position in the intermediate transport area and the lift portion has moved downward to a lower limit position, and to be located below the supporting surface of the supporting portion when the transfer device is located at a position other than the specific position.

With this configuration, it is possible to smoothly transfer articles to/from the first transport portion and the second transport portion using the conveyor unit, at least a portion of which protrudes upward from the supporting surface of the supporting portion when the transfer device is located at the specific position in the intermediate transport area. When the transfer device is located at a position other than the specific position, the conveyor unit is located below the supporting surface of the supporting portion, and the base pallet on the supporting portion is not prevented from moving in the vehicle's widthwise direction when the sliding portion slides. Therefore, it is possible to smoothly transfer articles on the base pallet to/from the load bed of the transport vehicle as well.

In another aspect, it is preferable that the platform is provided as a pair of platforms that face each other with a travel path therebetween on which the transport vehicle travels, and the transfer device is configured to move back and forth in the vehicle's widthwise direction between the respective intermediate transport areas of the pair of platforms, and to transfer articles between either one of the platforms and a transport vehicle that is parked on the berth corresponding thereto.

With this configuration, the transfer device is shared between the pair of platforms that are provided so as to face each other with the travel path therebetween. Therefore, compared to a configuration in which an individual transfer device is provided for each of the pair of platforms, in a state where the operation efficiency of each transfer device is not very high, it is possible to reduce the area on which the facility is installed, without affecting the operation efficiency of the transport vehicle very much.

A distribution facility according to the present disclosure need only to achieve at least one of the above-described advantageous effects.

REFERENCE SIGNS LIST

1: Distribution Facility
2: Platform
2e: Platform Edge
4: Berth
5: Transfer Device
21: First transport portion
26: Second transport portion
51: Travelling Portion
52: Supporting Portion
52b: Supporting Surface
53: Sliding Portion
54: Lift Portion
55: Conveyor Unit
61: Travel Rail
A: Article
B: Base Pallet
T: Transport Vehicle
C: Load Bed
W: Vehicle's Widthwise Direction
R: Travel Path
Ri: Intermediate Transport Area
Ra: Load Bed Adjacent Area
P1: First Position (Specific Position)
P2: Second Position (Specific Position)
H1: First Height
H2: Second Height

The invention claimed is:

1. A distribution facility comprising:
   a platform that is provided with a first transport portion that transports articles that are to be shipped, and a second transport portion that transports articles that have been received;
   a berth that is provided along a platform edge of the platform to allow a transport vehicle to be parked side-on; and a transfer device that moves back and forth between an intermediate transport area and a load bed adjacent area in the vehicle's widthwise direction to transfer an article between the platform and the transport vehicle, the intermediate transport area being located downstream of the first transport portion and upstream of the second transport portion, and the load bed adjacent area being adjacent to a load bed of the transport vehicle when the transport vehicle is parked on the berth, wherein the transfer device includes a travelling portion that travels along a travel rail that is provided in the vehicle's widthwise direction, wherein the transfer device includes: a supporting portion that supports, from below, the base pallet on which the articles are placed; a sliding portion that slides in the vehicle's widthwise direction relative to the supporting portion, in a state of being locked to the base pallet; and a lift portion that is provided for the travelling portion and raises and lowers the sliding portion and the supporting portion, and wherein the lift portion is configured to move upward and downward to switch the height of a supporting surface of the supporting portion to a first height set depending on the height of supporting surfaces of the first transport portion and the second transport portion, and a second height set depending on the height of a supporting surface of the load bed of the transport vehicle.

2. The distribution facility according to claim 1, wherein the transfer device passes and receives a plurality of articles that are placed on a single base pallet, all at once.

3. The distribution facility according to claim 1, wherein the transfer device further includes a conveyor unit that is configured to transport the articles in a direction that is orthogonal to the vehicle's widthwise direction, and wherein the conveyor unit is configured to move in a vertical direction relative to the supporting portion, and to protrude upward from the supporting surface of the supporting portion when the transfer device is located at a specific position in the intermediate transport area and the lift portion has moved downward to a lower limit position, and to be located below the supporting surface of the supporting portion when the transfer device is located at a position other than the specific position.

4. The distribution facility according to claim 1, wherein the platform is provided as a pair of platforms that face each other with a travel path therebetween on which the transport vehicle travels, and wherein the transfer device is configured to move back and forth in the vehicle's widthwise direction between the respective intermediate transport areas of the pair of platforms, and to transfer articles between either one of the platforms and a transport vehicle that is parked on the berth corresponding thereto.

5. The distribution facility according to claim 1, wherein the platform in plan view has a shape with a rectangular cutout position, the intermediate transport area is provided in an area of the cutout portion, and the first transport portion and the second transport portion are provided to face the cutout portion.

6. The distribution facility according to claim 5, wherein the first transport portion, the intermediate transport area and the second transport portion are aligned.

7. The distribution facility according to claim 1, further comprising a berth forming deck protruding from the platform edge of the platform toward a travel path through which the transport vehicle travels, wherein the berth is provided along a deck edge of the berth forming deck, and the load bed adjacent area is provided in an area in which the berth forming deck is formed.

8. The distribution facility according to claim 1, wherein the transport vehicle is a truck.

9. The distribution facility according to claim 8, wherein the truck has a wing-type load bed, and the article is loaded and unloaded via an opening provided in a lateral side of the load bed, with the truck being parked on the berth.

10. The distribution facility according to claim 1, wherein the sliding portion has a hook portion with a locking claw at an end of the hook portion, and the hook portion is rotatable about a shaft that extends in a vertical direction.

11. The distribution facility according to claim 10, wherein the base pallet has: a lock-target portion to which the locking claw of the sliding portion is hooked; and a retracted portion which is formed at a position adjacent to the lock-target portion, for preventing interference with the locking claw.

* * * * *